United States Patent
Sasaki et al.

(10) Patent No.: US 9,696,213 B2
(45) Date of Patent: Jul. 4, 2017

(54) TEMPERATURE SENSOR WITH SUCCESSIVE AD CONVERSION WITH SELECTIVE COMPARISONS

(71) Applicants: KABUSHIKI KAISHA TOSHIBA, Minato-ku (JP); SanDisk Technologies LLC, Plano, TX (US)

(72) Inventors: Takahiko Sasaki, Tokyo (JP); Gopinath Balakrishnan, Santa Clara, CA (US)

(73) Assignees: KABUSHIKI KAISHA TOSHIBA, Minato-ku (JP); SanDisk Technologies LLC, Plano, TX (US)

( * ) Notice: Subject to any disclaimer, the term of this patent is extended or adjusted under 35 U.S.C. 154(b) by 590 days.

(21) Appl. No.: 14/199,082

(22) Filed: Mar. 6, 2014

(65) Prior Publication Data

US 2015/0073743 A1 Mar. 12, 2015

Related U.S. Application Data

(60) Provisional application No. 61/876,539, filed on Sep. 11, 2013.

(51) Int. Cl.
*G01K 7/01* (2006.01)
*G01K 1/02* (2006.01)

(52) U.S. Cl.
CPC .......... *G01K 1/02* (2013.01); *G01K 2219/00* (2013.01)

(58) Field of Classification Search
None
See application file for complete search history.

(56) References Cited

U.S. PATENT DOCUMENTS

| | | | |
|---|---|---|---|
| 5,581,255 A * | 12/1996 | Hsu | H03M 1/147 341/156 |
| 5,623,265 A | 4/1997 | Pawar et al. | |
| 5,682,163 A | 10/1997 | Hsu | |
| 6,542,104 B1 * | 4/2003 | Capofreddi | H03M 7/165 341/102 |
| 7,446,690 B2 * | 11/2008 | Kao | H03K 19/17732 341/139 |
| 7,973,692 B2 * | 7/2011 | Chmelar | H03M 1/1215 341/155 |

(Continued)

FOREIGN PATENT DOCUMENTS

| | | |
|---|---|---|
| JP | 8-36466 | 2/1996 |
| JP | 9-69775 | 3/1997 |
| JP | 9-261056 | 10/1997 |

*Primary Examiner* — Lisa Caputo
*Assistant Examiner* — Nasir U Ahmed
(74) *Attorney, Agent, or Firm* — Oblon, McClelland, Maier & Neustadt, L.L.P.

(57) ABSTRACT

According to one embodiment, a temperature sensor includes: a voltage generating part generating $(2^N-1)$-midpoint voltages (N is a natural number equal to or larger than 2) based on a reference voltage which does not depend on a temperature; a sense part generating a temperature sensing voltage which depends on the temperature; and an arithmetic part is configured to generate N-bit temperature data by executing first to N-th operations each comparing the temperature sensing voltage with one of the $(2^N-1)$-midpoint voltages.

21 Claims, 12 Drawing Sheets

(56) References Cited

U.S. PATENT DOCUMENTS

2007/0286259 A1* 12/2007 Kwon ................... G01K 7/015
　　　　　　　　　　　　　　　　　　　374/170
2012/0283983 A1* 11/2012 Cheng ..................... G01K 7/01
　　　　　　　　　　　　　　　　　　　702/130

* cited by examiner

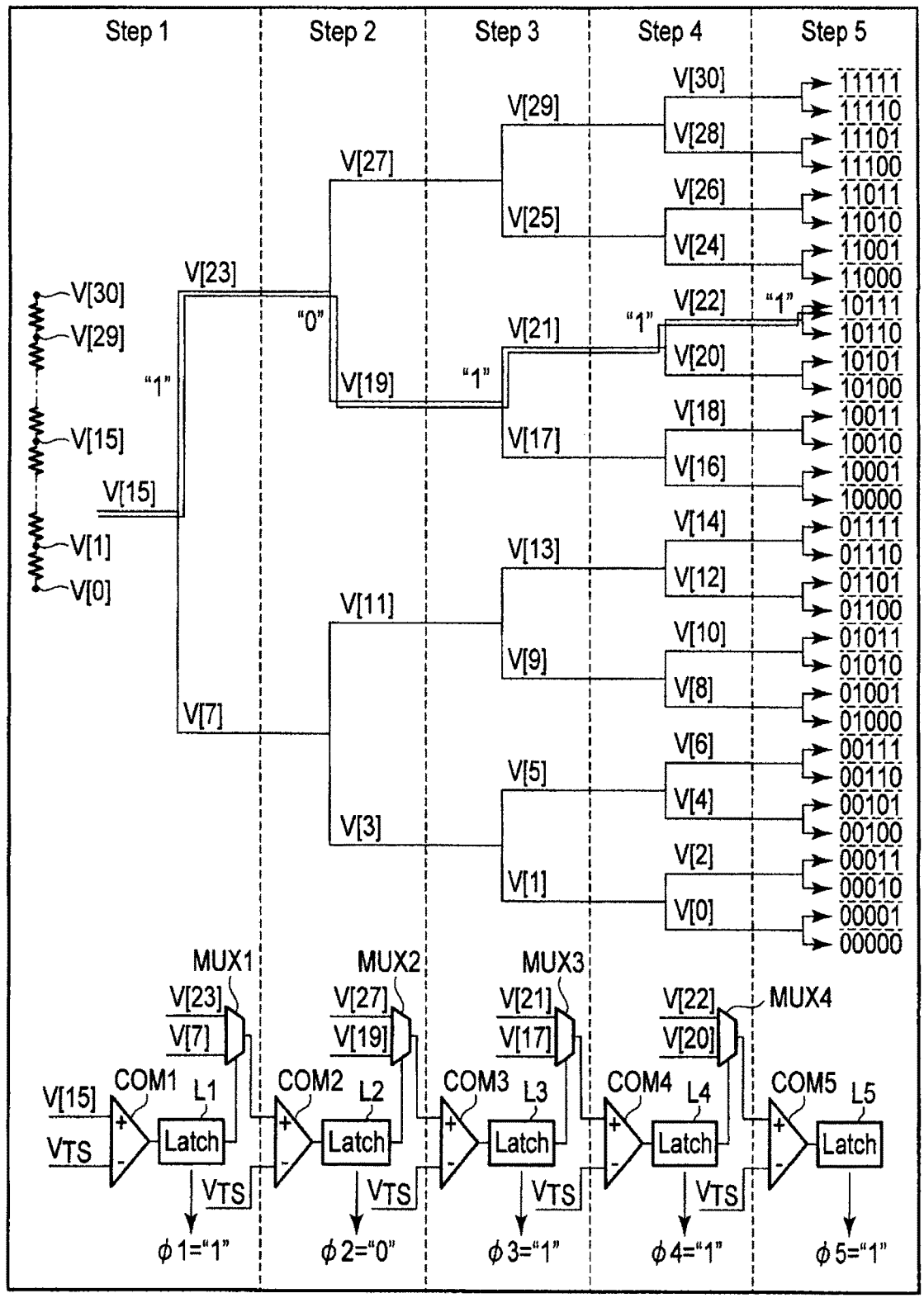
F I G. 2

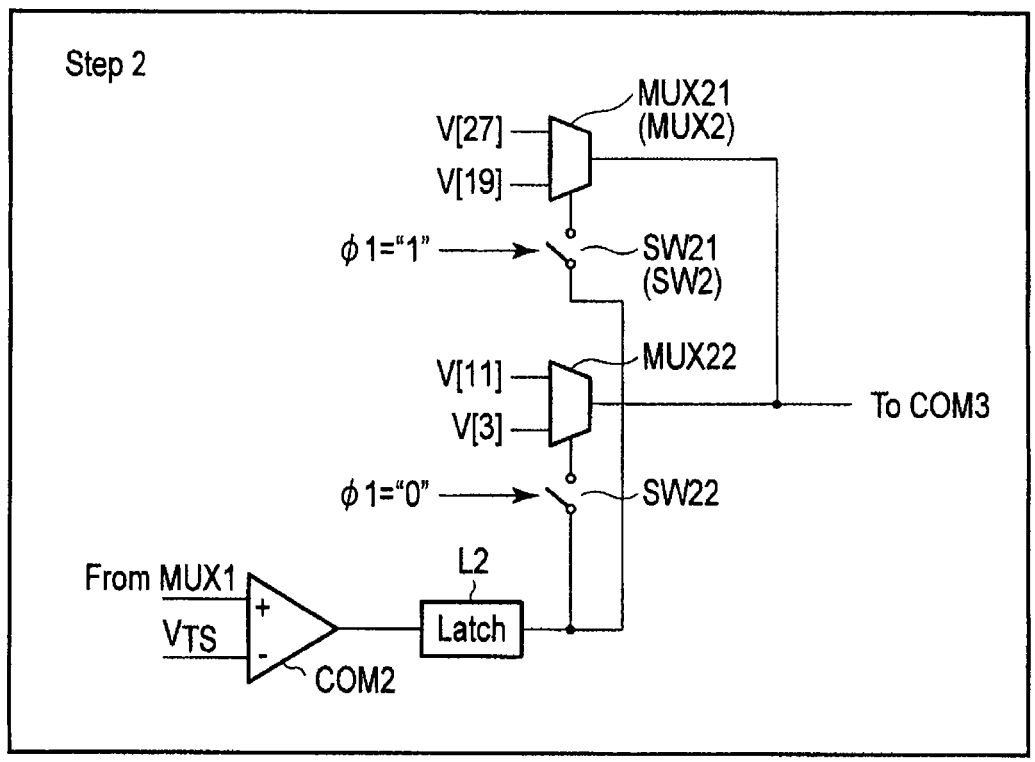
F I G. 3

TEMPERATURE SENSOR WITH SUCCESSIVE AD CONVERSION WITH SELECTIVE COMPARISONS

CROSS REFERENCE TO RELATED APPLICATIONS

This application claims the benefit of U.S. Provisional Application No. 61/876,539, filed Sep. 11, 2013, the entire contents of which are incorporated herein by reference.

FIELD

Embodiments described herein relate generally to a temperature sensor.

BACKGROUND

A temperature sensor determines a temperature Tc of an LSI chip by comparing a reference voltage $V_{REF}$ independent of the temperature, and temperature sensing voltage $V_{TS}$ dependent on the temperature with each other. For example, a reference voltage $V_{REF}$ is divided into $2^N-1$ intermediate voltages, and at which point between the $2^N-1$ intermediate voltages the temperature sensing voltage $V_{TS}$ is positioned is compared by using $2^N-1$ comparators. The comparison result becomes, for example, N-bit temperature data indicating the temperature Tc of the LSI chip.

However, the temperature sensor carries out comparison between the reference voltage $V_{REF}$, and temperature sensing voltage $V_{TS}$ simultaneously by using the $2^N-1$ comparators. As a result, first, the size of the temperature sensor becomes large, and the large size of the temperature sensor becomes a restriction on determining the layout in the LSI chip. Second, variations in performance of the $2^N-1$ comparators occur, and the variations become a cause of deterioration of the performance of the temperature sensor. In order to avoid this, it is sufficient if the size of the $2^N-1$ comparators is made larger. However, in this case, a problem that the size of the temperature sensor becomes larger occurs. Third, when the size of the comparators is made larger, the capacity concomitant with each of the comparators becomes larger, a waiting-time to the comparison to be carried out by these comparators is enabled occurs, and the time to detection of the temperature $T_C$ becomes longer.

BRIEF DESCRIPTION OF THE DRAWINGS

FIG. 2 is a view showing a first embodiment;

FIG. 3 is a view showing a circuit configured to carry out step 2 of FIG. 2;

DETAILED DESCRIPTION

Figure 1:
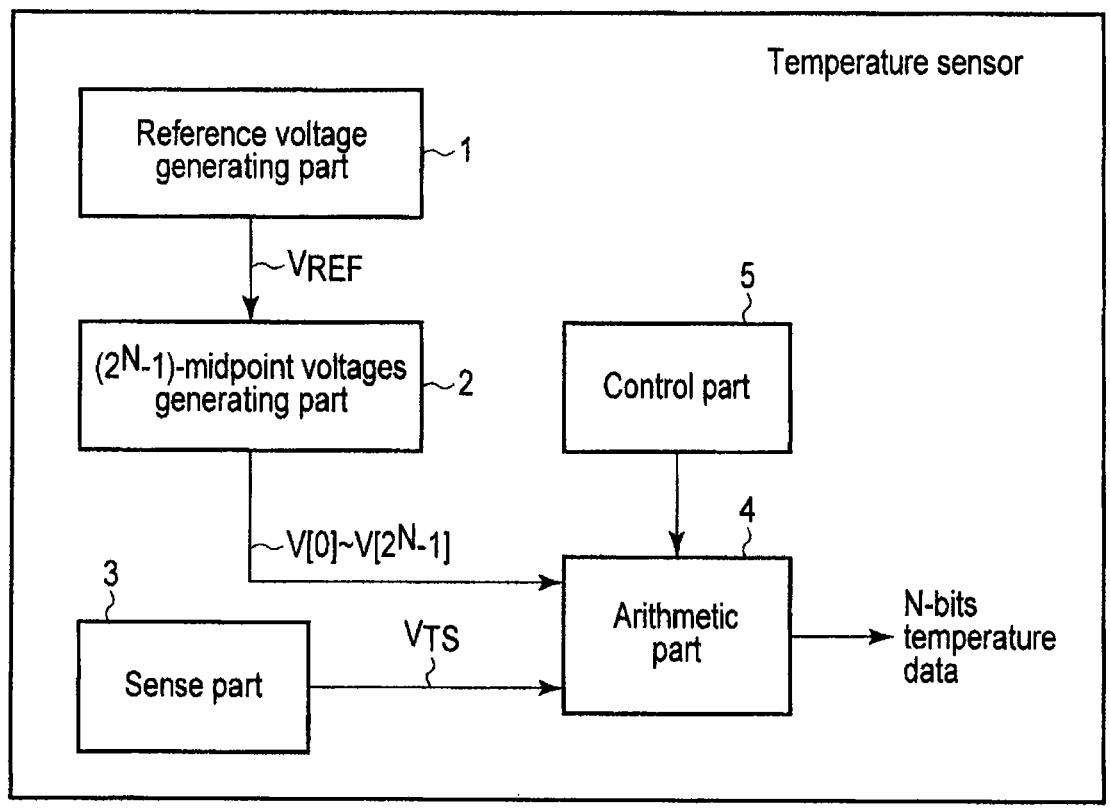
FIG. 1 is a view showing the basic configuration of a temperature sensor.

In general, according to one embodiment, a temperature sensor comprising: a voltage generating part generating $(2^N-1)$-midpoint voltages (N is a natural number equal to or larger than 2) based on a reference voltage which does not depend on a temperature; a sense part generating a temperature sensing voltage which depends on the temperature; and an arithmetic part is configured to generate N-bit temperature data by executing first to N-th operations each comparing the temperature sensing voltage with one of the $(2^N-1)$-midpoint voltages.

(Basic Concept)

A temperature sensor creates N-bit data indicating a real temperature Tc of an LSI chip by, for example, evaluating at which point between $2^N-1$ intermediate voltages a temperature sensing voltage $V_{TS}$ is positioned. Here, N is a natural number greater than or equal to 2. This evaluation can simultaneously be carried out by using, for example, $2^N-1$ comparators.

Conversely, in the following embodiments, N-bit data items indicating the real temperature Tc of the LSI chip are created by carrying out evaluations of a plurality of times such as first to Nth operations in place of the simultaneous evaluation.

In this case, the number of the comparators can be made smaller than $2^N-1$. For example, when the first to Nth operations are to be carried out in series, N is sufficient for the number of the comparators. Further, when first to Nth operations are carried out by repetitively using (reusing) one comparator, one is sufficient for the number of the comparators.

As described above, in the following embodiments, by contriving the flow of evaluating at which point between the $2^N-1$ intermediate voltages the temperature sensing voltage $V_{TS}$ is positioned, the number of comparators can be reduced.

As a result, the size of the temperature sensor becomes small, and the temperature sensor does not become a restriction on determining the layout in the LSI chip.

Particularly, when the number of comparators is one, it becomes possible to compensate for an offset of the comparator unlike the case where the number of comparators is plural. That is, the offset of the comparator can be compensated for, and hence it is possible to make the size of the comparator small, shorten the waiting-time before comparison to be carried out by the comparator is enabled, and contribute to shortening or the like of the time to detection of the real temperature Tc.

Further, in the following embodiments, an example of a method of compensating for an offset is proposed.

For example, a flow of evaluation in which the real temperature $T_C$ is detected by obtaining an average of the detection value at the time at which the temperature sensing voltage $V_{TS}$ is input to a non-inverting input terminal of the comparator, and detection value at the time at which the temperature sensing voltage $V_{TS}$ is input to an inverting input terminal of the comparator is proposed.

Thereby, it is possible to compensate for the offset of the comparator.

(Architecture of Temperature Sensor)

FIG. 1 shows the basic configuration of the temperature sensor.

A reference voltage generating part 1 creates a reference voltage $V_{REF}$ independent of the temperature. A ($2^N$–1)-midpoint voltages generating part 2 creates ($2^N$–1)-midpoint voltages V[0], V[1], . . . V[$2^N$–1] on the basis of the reference voltage $V_{REF}$. Here, N is a natural number greater than or equal to 2.

A sense part 3 creates a temperature sensing voltage $V_{TS}$ dependent on the temperature. The temperature sensing voltage $V_{TS}$ is dependent on the temperature of, for example, an LSI chip.

An arithmetic part 4 creates N-bit temperature data by carrying out first to Nth operations of comparing the temperature sensing voltage $V_{TS}$ with corresponding one of the ($2^N$–1)-midpoint voltages V[0], V[1], . . . V[$2^N$–2].

(First Embodiment)

FIG. 2 shows a first embodiment.

This embodiment is an embodiment in which 5-bit temperature data items φ1, φ2, φ3, φ4, and φ5 are created by first to fifth steps (first to fifth operations). First to fifth steps are carried out in series.

First, 31-midpoint voltages V[0], V[1], . . . V[30] are created on the basis of the reference voltage $V_{REF}$.

First to fifth steps are executed by first to fifth logic circuits, respectively. Each of the first to fifth logic circuits is provided with corresponding one of comparators COM1, COM2, COM3, COM4, and COM5 each configured to compare the temperature sensing voltage $V_{TS}$ with one of the 31-midpoint voltages V[0], V[1], . . . V[30], and corresponding one of latch circuits L1, L2, L3, L4, and L5 each configured to latch output signals of the comparators COM1, COM2, COM3, COM4, and COM5.

Each of the latch circuits L1, L2, L3, L4, and L5 latches one bit of each of the 5-bit temperature data items φ1, φ2, φ3, φ4, and φ5.

An ith logic circuit (i is one of 1 to 4) is provided with a multiplexer MUXi configured to select one of the 31-midpoint voltages V[0], V[1], . . . V[30] to be input to a comparator COM(i+1) in an (i+1)th logic circuit on the basis of one bit of one bit latched into a latch circuit Li in the ith logic circuit.

(1) First Step

In first step, the temperature sensing voltage $V_{TS}$ is compared with an intermediate value V[15] of the 31-midpoint voltages V[0], V[1], . . . V[30] by using the comparator COM1.

When $V_{TS}$ is greater than V[15] ($V_{TS}$>V[15]), the output of the comparator COM1 becomes "1", and is latched into the latch circuit L1. When $V_{TS}$ is smaller than V[15] ($V_{TS}$>V[15]), the output of the comparator COM1 becomes "0", and is latched into the latch circuit L1. The data "1"/"0" latched into the latch circuit L1 determines the most significant bit φ1 of the 5-bit temperature data.

In FIG. 2, an example in which φ1 is "1" (φ1="1") is shown.

In first step, selection of an intermediate voltage to be input to the comparator COM2 used in second step is carried out.

That is, when the result of first step is $V_{TS}$>V[15], i.e., when the data φ1 latched into the latch circuit L1 is "1", the multiplexer MUX1 selects V[23] from among V[7] and V[23]. Further, when the result of first step is $V_{TS}$<V[15], i.e., when the data φ1 latched into the latch circuit L1 is "0", the multiplexer MUX1 selects V[7] from among V[7] and V[23].

(2) Second Step

In second step, when the result of first step is $V_{TS}$>V[15], i.e., when the data latched into the latch circuit L1 is "1", the temperature sensing voltage $V_{TS}$ is compared with an intermediate value V[23] of 15-midpoint voltages V[16], V[17], . . . V[30] by using the comparator COM2.

When $V_{TS}$ is greater than V[23] ($V_{TS}$>V[23]), the output of the comparator COM2 becomes "1", and is latched into the latch circuit L2. When $V_{TS}$ is smaller than V[23] ($V_{TS}$<V[23]), the output of the comparator COM2 becomes "0", and is latched into the latch circuit L2. The data "1"/"0" latched into the latch circuit L2 determines an intermediate bit φ2 of the 5-bit temperature data.

In second step, when the result of first step is $V_{TS}$<V[15], i.e., when the data latched into the latch circuit L1 is "0", the temperature sensing voltage $V_{TS}$ is compared with an intermediate value V[7] of 15-midpoint voltages V[0], V[1], . . . V[14] by using the comparator COM2.

When $V_{TS}$ is greater than V[7] ($V_{TS}$>V[7]), the output of the comparator COM2 becomes "1", and is latched into the latch circuit L2. When $V_{TS}$ is smaller than V[7] ($V_{TS}$<V[7]), the output of the comparator COM2 becomes "0", and is latched into the latch circuit L2. The data "1"/"0" latched into the latch circuit L2 determines the intermediate bit φ2 of the 5-bit temperature data.

In FIG. 2, an example in which φ2 is "0" (φ2="0") is shown.

In second step, selection of an intermediate voltage to be input to the comparator COM3 used in third step is carried out. The selection of the intermediate voltage is carried out in a form in which the result of first step is reflected.

More specifically, the selection of the intermediate voltage is executed by using a circuit of FIG. 3.

That is, when the result of first step is $V_{TS}$>V[15], i.e., when the data latched into the latch circuit L1 is "1", a switch SW21(SW2) is turned on.

In this case, when the result of second step is $V_{TS}$>V[23], i.e., when the data latched into the latch circuit L2 is "1", a multiplexer MUX21(MUX2) selects V[27] from among V[19] and V[27]. Further, when the result of second step is $V_{TS}$<V[23], i.e., when the data latched into the latch circuit L2 is "0", the multiplexer MUX21(MUX2) selects V[19] from among V[19] and V[27].

On the other hand, when the result of first step is $V_{TS}$<V[15], i.e., when the data latched into the latch circuit L1 is "0", a switch SW22 is turned on.

In this case, when the result of second step is $V_{TS}$>V[7], i.e., when the data latched into the latch circuit L2 is "1", a multiplexer MUX22 selects V[11] from among V[3] and V[11]. Further, when the result of second step is $V_{TS}$<V[7], i.e., when the data latched into the latch circuit L2 is "0", the multiplexer MUX22 selects V[3] from among V[3] and V[11].

(3) Third Step

In third step, when the result of second step is $V_{TS}$>V[23], i.e., when the data latched into the latch circuit L2 is "1", the temperature sensing voltage $V_{TS}$ is compared with an intermediate value V[27] of 7-midpoint voltages V[24], V[25], . . . V[30] by using the comparator COM3.

When $V_{TS}$ is greater than V[27] ($V_{TS}$>V[27]), the output of the comparator COM3 becomes "1", and is latched into the latch circuit L3. When $V_{TS}$ is smaller than V[27] ($V_{TS}$<V[27]), the output of the comparator COM3 becomes "0", and is latched into the latch circuit L3. The data "1"/"0" latched into the latch circuit L3 determines an intermediate bit φ3 of the 5-bit temperature data.

In third step, when the result of second step is $V_{TS}$<V[23], i.e., when the data latched into the latch circuit L2 is "0", the temperature sensing voltage $V_{TS}$ is compared with an intermediate value V[19] of 7-midpoint voltages V[16], V[17], ... V[22] by using the comparator COM3.

When $V_{TS}$ is greater than V[19] ($V_{TS}$>V[19]), the output of the comparator COM3 becomes "1", and is latched into the latch circuit L3. When $V_{TS}$ is smaller than V[19] ($V_{TS}$<V[19]), the output of the comparator COM3 becomes "0", and is latched into the latch circuit L3. The data "1"/"0" latched into the latch circuit L3 determines the intermediate bit φ3 of the 5-bit temperature data.

In third step, when the result of second step is $V_{TS}$>V[7], i.e., when the data latched into the latch circuit L2 is "1", the temperature sensing voltage $V_{TS}$ is compared with an intermediate value V[11] of 7-midpoint voltages V[8], V[9], ... V[14] by using the comparator COM3.

When $V_{TS}$ is greater than V[11] ($V_{TS}$>V[11]), the output of the comparator COM3 becomes "1", and is latched into the latch circuit L3. When $V_{TS}$ is smaller than V[11] ($V_{TS}$<V[11]), the output of the comparator COM3 becomes "0", and is latched into the latch circuit L3. The data "1"/"0" latched into the latch circuit L3 determines the intermediate bit φ3 of the 5-bit temperature data.

In third step, when the result of second step is $V_{TS}$<V[7], i.e., when the data latched into the latch circuit L2 is "0", the temperature sensing voltage $V_{TS}$ is compared with an intermediate value V[3] of 7-midpoint voltages V[0], V[1], ... V[7] by using the comparator COM3.

When $V_{TS}$ is greater than V[3] ($V_{TS}$>V[3]), the output of the comparator COM3 becomes "1", and is latched into the latch circuit L3. When $V_{TS}$ is smaller than V[3] ($V_{TS}$<V[3]), the output of the comparator COM3 becomes "0", and is latched into the latch circuit L3. The data "1"/"0" latched into the latch circuit L3 determines the intermediate bit φ3 of the 5-bit temperature data.

In FIG. 2, an example in which φ3 is "1" (φ3="1") is shown.

In third step, selection of an intermediate voltage to be input to the comparator COM4 used in fourth step is carried out. The selection of the intermediate voltage is carried out in a form in which the results of first and second steps are reflected.

Figure 4:
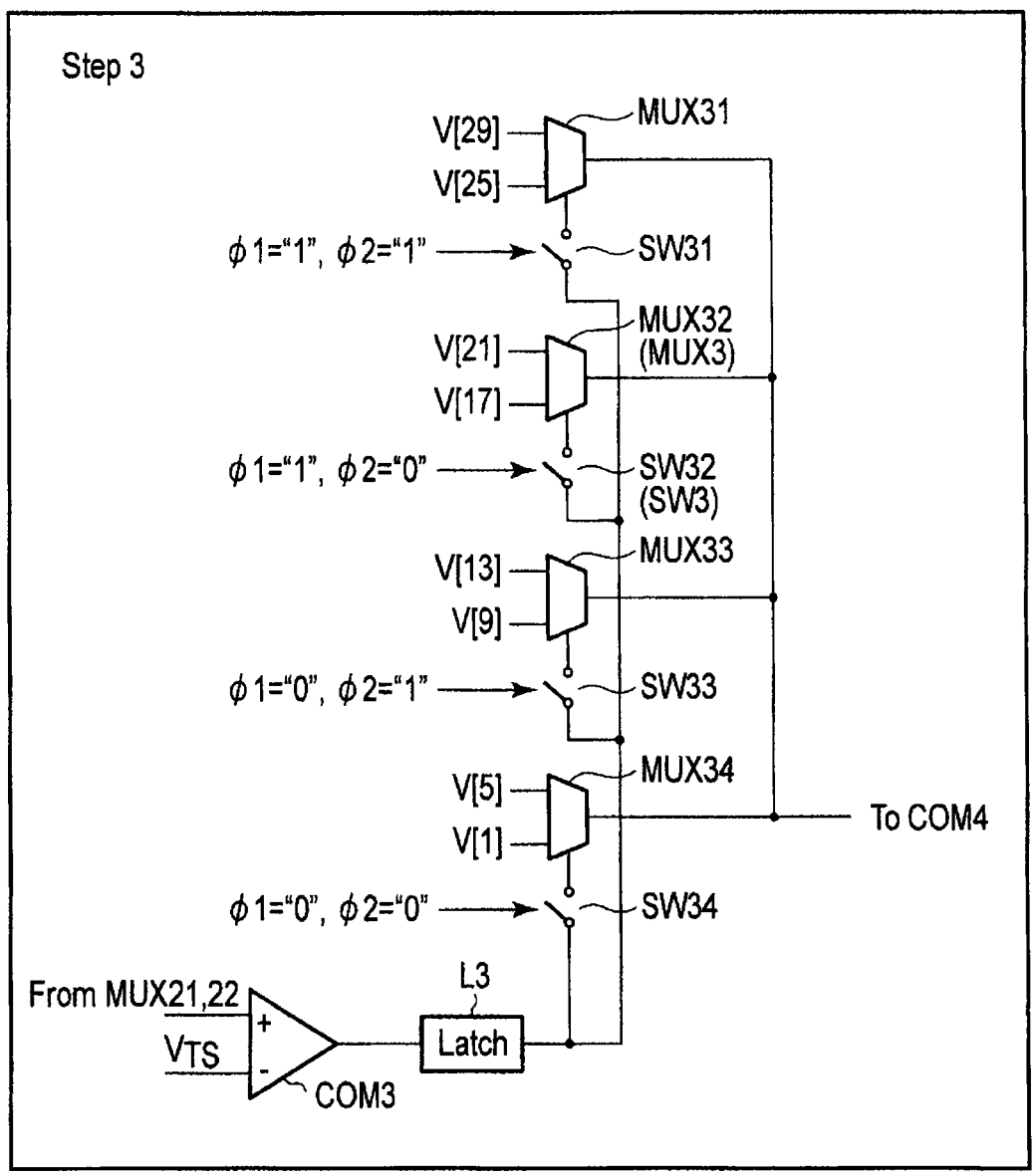
FIG. 4 is a view showing a circuit configured to carry out step 3 of FIG. 2.

More specifically, the selection of the intermediate voltage is executed by using a circuit of FIG. 4.

That is, when the result of first step is "1", and result of second step is "1", a switch SW31 is turned on.

In this case, when the data latched into the latch circuit L3 is "1", a multiplexer MUX31 selects V[29] from among V[25] and V[29]. Further, when the data latched into the latch circuit L3 is "0", the multiplexer MUX31 selects V[25] from among V[25] and V[29].

When the result of first step is "1", and result of second step is "0", a switch SW32(SW3) is turned on.

In this case, when the data latched into the latch circuit L3 is "1", a multiplexer MUX32 selects V[21] from among V[17] and V[21]. Further, when the data latched into the latch circuit L3 is "0", the multiplexer MUX32 selects V[17] from among V[17] and V[21].

When the result of first step is "0", and result of second step is "1", a switch SW33 is turned on.

In this case, when the data latched into the latch circuit L3 is "1", the multiplexer MUX33 selects V[13] from among V[9] and V[13]. Further, when the data latched into the latch circuit L3 is "0", the multiplexer MUX33 selects V[9] from among V[9] and V[13].

When the result of first step is "0", and result of second step is "0", a switch SW34 is turned on.

In this case, when the data latched into the latch circuit L3 is "1", a multiplexer MUX34 selects V[5] from among V[1] and V[5]. Further, when the data latched into the latch circuit L3 is "0", the multiplexer MUX34 selects V[1] from among V[1] and V[5].

(4) Fourth Step

In fourth step, when the result of third step is $V_{TS}$>V[27], the temperature sensing voltage $V_{TS}$ is compared with an intermediate value V[29] by using the comparator COM4.

When $V_{TS}$ is greater than V[29] ($V_{TS}$>V[29]), the output of the comparator COM4 becomes "1", and is latched into the latch circuit L4. When $V_{TS}$ is smaller than V[29] ($V_{TS}$<V[29]), the output of the comparator COM4 becomes "0", and is latched into the latch circuit L4.

In fourth step, when the result of third step is $V_{TS}$<V[27], the temperature sensing voltage $V_{TS}$ is compared with an intermediate value V[25] by using the comparator COM4.

When $V_{TS}$ is greater than V[25] ($V_{TS}$>V[25]), the output of the comparator COM4 becomes "1", and is latched into the latch circuit L4. When $V_{TS}$ is smaller than V[25] ($V_{TS}$<V[25]), the output of the comparator COM4 becomes "0", the output of the comparator COM4 becomes "0", and is latched into the latch circuit L4.

In fourth step, when the result of third step is $V_{TS}$>V[19], the temperature sensing voltage $V_{TS}$ is compared with an intermediate value V[21] by using the comparator COM4.

When $V_{TS}$ is greater than V[21] ($V_{TS}$>V[21]), the output of the comparator COM4 becomes "1", and is latched into the latch circuit L4. When $V_{TS}$ is smaller than V[21] ($V_{TS}$<V[21]), the output of the comparator COM4 becomes "0", and is latched into the latch circuit L4.

In fourth step, when the result of third step is $V_{TS}$<V[19], the temperature sensing voltage $V_{TS}$ is compared with an intermediate value V[17] by using the comparator COM4.

When $V_{TS}$ is greater than V[17] ($V_{TS}$>V[17]), the output of the comparator COM4 becomes "1", and is latched into the latch circuit L4. When $V_{TS}$ is smaller than V[17] ($V_{TS}$<V[17]), the output of the comparator COM4 becomes "0", and is latched into the latch circuit L4.

In fourth step, when the result of third step is $V_{TS}$>V[11], the temperature sensing voltage $V_{TS}$ is compared with an intermediate value V[13] by using the comparator COM4.

When $V_{TS}$ is greater than V[13] ($V_{TS}$>V[13]), the output of the comparator COM4 becomes "1", and is latched into the latch circuit L4. When $V_{TS}$ is smaller than V[13] ($V_{TS}$<V[13]), the output of the comparator COM4 becomes "0", and is latched into the latch circuit L4.

In fourth step, when the result of third step is $V_{TS}$<V[11], the temperature sensing voltage $V_{TS}$ is compared with an intermediate value V[9] by using the comparator COM4.

When $V_{TS}$ is greater than V[9] ($V_{TS}$>V[9]), the output of the comparator COM4 becomes "1", and is latched into the latch circuit L4. When $V_{TS}$ is smaller than V[9] ($V_{TS}$<V[9]), the output of the comparator COM4 becomes "0", and is latched into the latch circuit L4.

In fourth step, when the result of third step is $V_{TS}$>V[3], the temperature sensing voltage $V_{TS}$ is compared with an intermediate value V[5] by using the comparator COM4.

When $V_{TS}$ is greater than V[5] ($V_{TS}$>V[5]), the output of the comparator COM4 becomes "1", and is latched into the latch circuit L4. When $V_{TS}$ is smaller than V[5] ($V_{TS}$<V[5]), the output of the comparator COM4 becomes "0", and is latched into the latch circuit L4.

In fourth step, when the result of third step is $V_{TS}$<V[3], the temperature sensing voltage $V_{TS}$ is compared with an intermediate value V[1] by using the comparator COM4.

When $V_{TS}$ is greater than V[1] ($V_{TS}$>V[1]), the output of the comparator COM4 becomes "1", and is latched into the latch circuit L4. When $V_{TS}$ is smaller than V[1] ($V_{TS}$<V[1]), the output of the comparator COM4 becomes "0", and is latched into the latch circuit L4.

It should be noted that the data "1"/"0" latched into the latch circuit L4 determines an intermediate bit φ4 of the 5-bit temperature data.

In FIG. 2, an example in which φ4 is "1" (φ4="1") is shown.

In fourth step, selection of an intermediate voltage to be input to the comparator COM5 used in fifth step is carried out. The selection of the intermediate voltage is carried out in a form in which the results of first to third steps are reflected.

Figure 5:
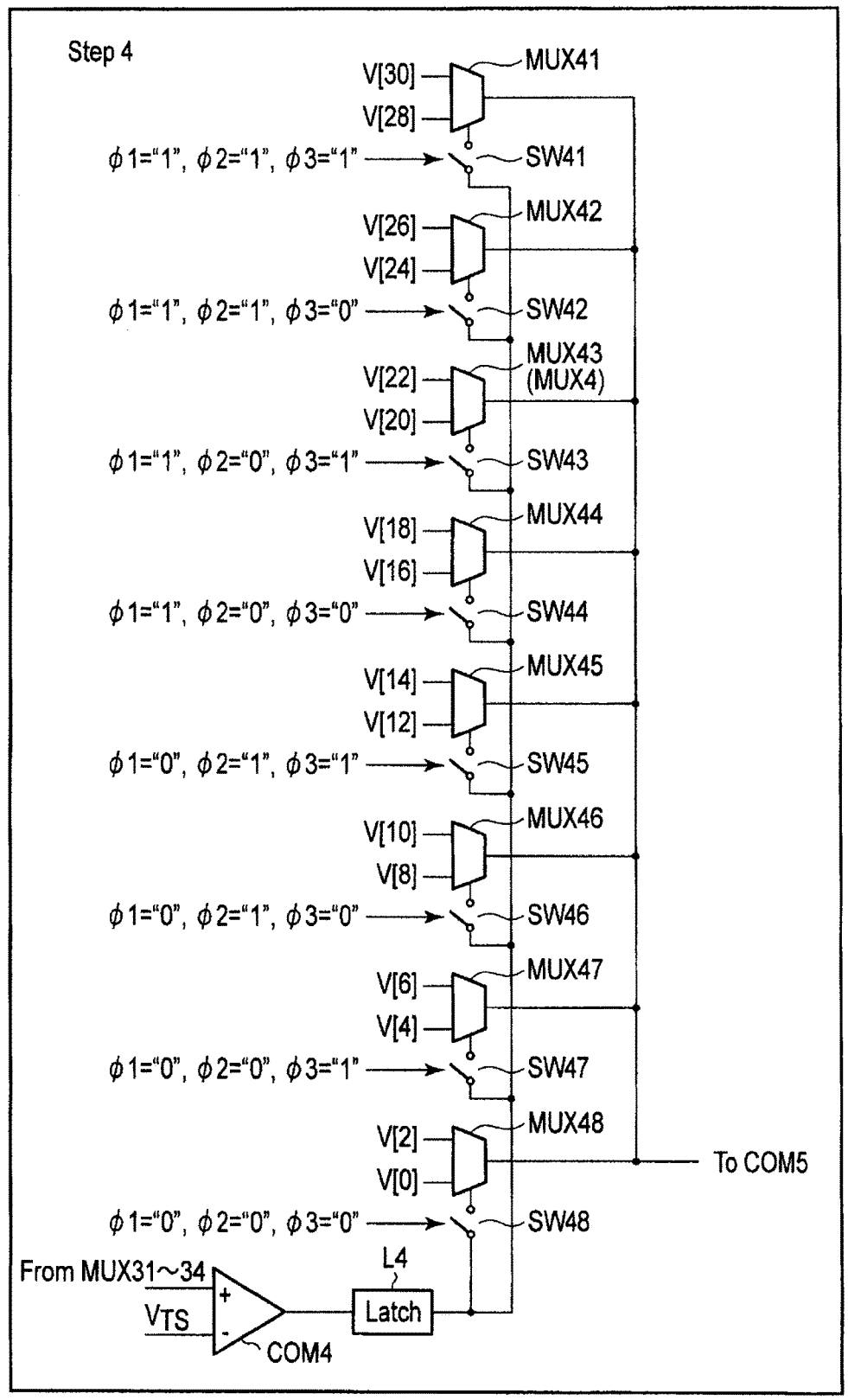
FIG. 5 is a view showing a circuit configured to carry out step 4 of FIG. 2.

More specifically, the selection of the intermediate voltage is executed by using a circuit of FIG. 5.

That is, when the result of first step is "1", result of second step is "1", and result of third step is "1", a switch SW41 is turned on.

In this case, when the data latched into the latch circuit L4 is "1", a multiplexer MUX41 selects V[30] from among V[28] and V[30]. Further, when the data latched into the latch circuit L4 is "0", the multiplexer MUX41 selects V[28] from among V[28] and V[30].

When the result of first step is "1", result of second step is "1", and result of third step is "0", a switch SW42 is turned on.

In this case, when the data latched into the latch circuit L4 is "1", a multiplexer MUX42 selects V[26] from among V[24] and V[26]. Further, when the data latched into the latch circuit L4 is "0", the multiplexer MUX42 selects V[24] from among V[24] and V[26].

When the result of first step is "1", result of second step is "0", and result of third step is "1", a switch SW43(SW4) is turned on.

In this case, when the data latched into the latch circuit L4 is "1", a multiplexer MUX43 selects V[22] from among V[20] and V[22]. Further, when the data latched into the latch circuit L4 is "0", the multiplexer MUX43 selects V[20] from among V[20] and V[22].

When the result of first step is "1", result of second step is "0", and result of third step is "0", a switch SW44 is turned on.

In this case, when the data latched into the latch circuit L4 is "1", a multiplexer MUX44 selects V[18] from among V[16] and V[18]. Further, when the data latched into the latch circuit L4 is "0", the multiplexer MUX44 selects V[16] from among V[16] and V[18].

When the result of first step is "0", result of second step is "1", and result of third step is "1", a switch SW45 is turned on.

In this case, when the data latched into the latch circuit 14 is "1", a multiplexer MUX45 selects V[14] from among V[12] and V[14]. Further, when the data latched into the latch circuit L4 is "0", the multiplexer MUX45 selects V[12] from among V[12] and V[14].

When the result of first step is "0", result of second step is "1", and result of third step is "0", a switch SW46 is turned on.

In this case, when the data latched into the latch circuit L4 is "1", a multiplexer MUX46 selects V[10] from among V[8] and V[10]. Further, when the data latched into the latch circuit L4 is "0", the multiplexer MUX46 selects V[8] from among V[8] and V[10].

When the result of first step is "0", result of second step is "0", and result of third step is "1", a switch SW47 is turned on.

In this case, when the data latched into the latch circuit L4 is "1", a multiplexer MUX47 selects V[6] from among V[4] and V[6]. Further, when the data latched into the latch circuit L4 is "0", the multiplexer MUX47 selects V[4] from among V[4] and V[6].

When the result of first step is "0", result of second step is "0", and result of third step is "0", a switch SW48 is turned on.

In this case, when the data latched into the latch circuit L4 is "1", a multiplexer MUX48 selects V[2] from among V[0] and V[2]. Further, when the data latched into the latch circuit L4 is "0", the multiplexer MUX48 selects V[0] from among V[0] and V[2].

(5) Fifth Step

In fifth step, when the result of fourth step is $V_{TS}$>V[29], the temperature sensing voltage $V_{TS}$ is compared with an intermediate value V[30] by using the comparator COM5.

When $V_{TS}$ is greater than V[30] ($V_{TS}$>V[30]), the output of the comparator COM5 becomes "1", and is latched into the latch circuit L5. When $V_{TS}$ is smaller than V[30] ($V_{TS}$<V[30]), the output of the comparator COM5 becomes "0", and is latched into the latch circuit L5.

In fifth step, when the result of fourth step is $V_{TS}$<V[29], the temperature sensing voltage $V_{TS}$ is compared with an intermediate value V[28] by using the comparator COM5.

When $V_{TS}$ is greater than V[28] ($V_{TS}$>V[28]), the output of the comparator COM5 becomes "1", and is latched into the latch circuit L5. When $V_{TS}$ is smaller than V[28] ($V_{TS}$<V[28]), the output of the comparator COM5 becomes "0", and is latched into the latch circuit L5.

In fifth step, when the result of fourth step is $V_{TS}$>V[25], the temperature sensing voltage $V_{TS}$ is compared with an intermediate value V[26] by using the comparator COM5.

When $V_{TS}$ is greater than V[26] ($V_{TS}$>V[26]), the output of the comparator COM5 becomes "1", and is latched into the latch circuit L5. When $V_{TS}$ is smaller than V[26] ($V_{TS}$<V[26]), the output of the comparator COM5 becomes "0", and is latched into the latch circuit L5.

In fifth step, when the result of fourth step is $V_{TS}$<V[25], the temperature sensing voltage $V_{TS}$ is compared with an intermediate value V[24] by using the comparator COM5.

When $V_{TS}$ is greater than V[24] ($V_{TS}$>V[24]), the output of the comparator COM5 becomes "1", and is latched into the latch circuit L5. When $V_{TS}$ is smaller than V[24] ($V_{TS}$<V[24]), the output of the comparator COM5 becomes "0", and is latched into the latch circuit L5.

In fifth step, when the result of fourth step is $V_{TS}$>V[21], the temperature sensing voltage $V_{TS}$ is compared with an intermediate value V[22] by using the comparator COM5.

When $V_{TS}$ is greater than V[22] ($V_{TS}$>V[22]), the output of the comparator COME becomes "1", and is latched into the latch circuit L5. When $V_{TS}$ is smaller than V[22] ($V_{TS}$<V[22]), the output of the comparator COM5 becomes "0", and is latched into the latch circuit L5.

In fifth step, when the result of fourth step is $V_{TS}$<V[21], the temperature sensing voltage $V_{TS}$ is compared with an intermediate value V[20] by using the comparator COM5.

When $V_{TS}$ is greater than V[20] ($V_{TS}$>V[20]), the output of the comparator COM5 becomes "1", and is latched into the latch circuit L5. When $V_{TS}$ is smaller than V[20] ($V_{TS}$<V

[20]), the output of the comparator COME becomes "0", and is latched into the latch circuit L5.

In fifth step, when the result of fourth step is $V_{TS}>V[17]$, the temperature sensing voltage $V_{TS}$ is compared with an intermediate value V[18] by using the comparator COM5.

When $V_{TS}$ is greater than V[18] ($V_{TS}>V[18]$), the output of the comparator COME becomes "1", and is latched into the latch circuit L5. When $V_{TS}$ is smaller than V[18] ($V_{TS}<V[18]$), the output of the comparator COM5 becomes "0", and is latched into the latch circuit L5.

In fifth step, when the result of fourth step is $V_{TS}<V[17]$, the temperature sensing voltage $V_{TS}$ is compared with an intermediate value V[16] by using the comparator COM5.

When $V_{TS}$ is greater than V[16] ($V_{TS}>V[16]$), the output of the comparator COM5 becomes "1", and is latched into the latch circuit L5. When $V_{TS}$ is smaller than V[16] ($V_{TS}<V[16]$), the output of the comparator COM5 becomes "0", and is latched into the latch circuit L5.

In fifth step, when the result of fourth step is $V_{TS}>V[13]$, the temperature sensing voltage $V_{TS}$ is compared with an intermediate value V[14] by using the comparator COM5.

When $V_{TS}$ is greater than V[14] ($V_{TS}>V[14]$), the output of the comparator COM5 becomes "1", and is latched into the latch circuit L5. When $V_{TS}$ is smaller than V[14] ($V_{TS}<V[14]$), the output of the comparator COM5 becomes "0", and is latched into the latch circuit L5.

In fifth step, when the result of fourth step is $V_{TS}<V[13]$, the temperature sensing voltage $V_{TS}$ is compared with an intermediate value V[12] by using the comparator COM5.

When $V_{TS}$ is greater than V[12] ($V_{TS}>V[12]$), the output of the comparator COM5 becomes "1", and is latched into the latch circuit L5. When $V_{TS}$ is smaller than V[12] ($V_{TS}<V[12]$), the output of the comparator COM5 becomes "0", and is latched into the latch circuit L5.

In fifth step, when the result of fourth step is $V_{TS}>V[9]$, the temperature sensing voltage $V_{TS}$ is compared with an intermediate value V[10] by using the comparator COM5.

When $V_{TS}$ is greater than V[10] ($V_{TS}>V[10]$), the output of the comparator COM5 becomes "1", and is latched into the latch circuit L5. When $V_{TS}$ is smaller than V[10] ($V_{TS}<V[10]$), the output of the comparator COM5 becomes "0", and is latched into the latch circuit L5.

In fifth step, when the result of fourth step is $V_{TS}<V[9]$, the temperature sensing voltage $V_{TS}$ is compared with an intermediate value V[8] by using the comparator COM5.

When $V_{TS}$ is greater than V[8] ($V_{TS}>V[8]$), the output of the comparator COM5 becomes "1", and is latched into the latch circuit L5. When $V_{TS}$ is smaller than V[8] ($V_{TS}<V[8]$), the output of the comparator becomes "0", and is latched into the latch circuit L5.

In fifth step, when the result of fourth step is $V_{TS}>V[5]$, the temperature sensing voltage $V_{TS}$ is compared with an intermediate value V[6] by using the comparator COM5.

When $V_{TS}$ is greater than V[6] ($V_{TS}>V[6]$), the output of the comparator COM5 becomes "1", and is latched into the latch circuit L5. When $V_{TS}$ is smaller than V[6] ($V_{TS}<V[6]$), the output of the comparator COM5 becomes "0", and is latched into the latch circuit L5.

In fifth step, when the result of the fourth step is $V_{TS}<V[5]$, the temperature sensing voltage $V_{TS}$ is compared with an intermediate value V[4] by using the comparator COM5.

When $V_{TS}$ is greater than V[4] ($V_{TS}>V[4]$), the output of the comparator COM5 becomes "1", and is latched into the latch circuit L5. When $V_{TS}$ is smaller than V[4] ($V_{TS}<V[4]$), the output of the comparator COM5 becomes "0", and is latched into the latch circuit L5.

In fifth step, when the result of fourth step is $V_{TS}>V[1]$, the temperature sensing voltage $V_{TS}$ is compared with an intermediate value V[2] by using the comparator COM5.

When $V_{TS}$ is greater than V[2] ($V_{TS}>V[2]$), the output of the comparator COM5 becomes "1", and is latched into the latch circuit L5. When $V_{TS}$ is smaller than V[2] ($V_{TS}<V[2]$), the output of the comparator COM5 becomes "0", and is latched into the latch circuit L5.

In fifth step, when the result of fourth step is $V_{TS}<V[1]$, the temperature sensing voltage $V_{TS}$ is compared with an intermediate value V[0] by using the comparator COM5.

When $V_{TS}$ is greater than V[0] ($V_{TS}>V[0]$), the output of the comparator COM5 becomes "1", and is latched into the latch circuit L5. When $V_{TS}$ is smaller than V[0] ($V_{TS}<V[0]$), the output of the comparator COM5 becomes "0", and is latched into the latch circuit L5.

It should be noted that the data "1"/"0" latched into the latch circuit L5 determines the least significant bit φ5 of the 5-bit temperature data.

In FIG. 2, an example in which φ5 is "1" (φ5="1") is shown.

As described above, according to the first embodiment, it is possible to create 5-bit temperature data φ1="1", φ2="0", φ3="1", φ4="1", and φ5="1" indicating, for example, the real temperature Tc of an LSI chip by first to fifth steps.

Further, heretofore, although $2^5$ (=32) comparators have been required to create 5-bit temperature data, presence of five comparators is sufficient in the first embodiment. Accordingly, it is possible to reduce the size of the temperature sensor by virtue of significant reduction in the number of comparators.

(Second Embodiment)

Figure 6:
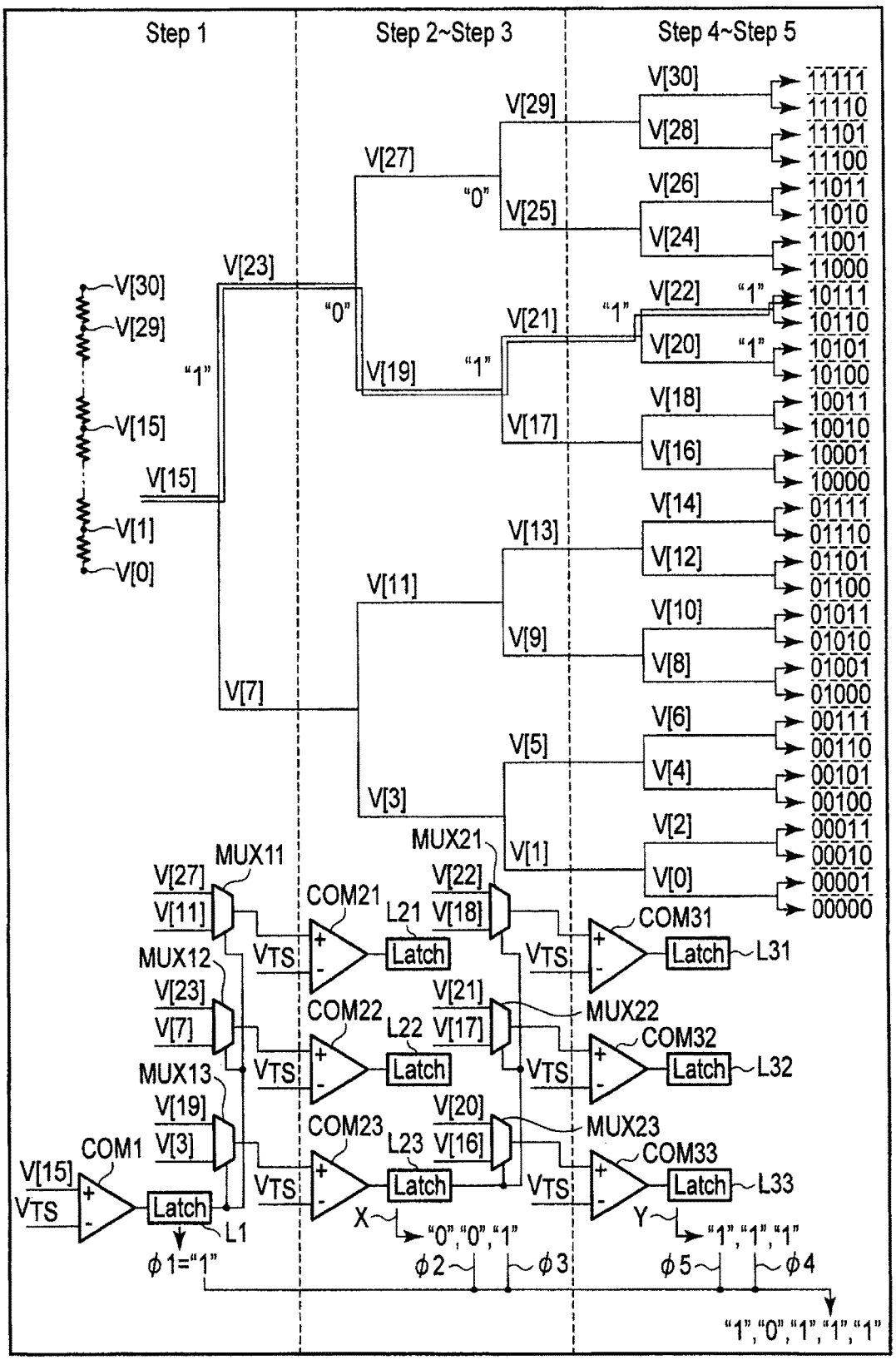
FIG. 6 is a view showing a second embodiment.

FIG. 6 shows a second embodiment.

The second embodiment is a modification of the first embodiment. The second embodiment differs from the first embodiment in that among first to fifth steps (first to fifth operations), second and third steps are simultaneously carried out, and fourth and fifth steps are simultaneously carried out.

First, 31-midpoint voltages V[0], V[1], . . . V[30] are created on the basis of a reference voltage $V_{REF}$.

First step is executed by a first logic circuit, second and third steps are executed by a second logic circuit, and fourth and fifth steps are carried out by a third logic circuit.

The first logic circuit is provided with a comparator COM1 configured to compare a temperature sensing voltage $V_{TS}$ with one of the 31-midpoint voltages V[0], V[1], . . . V[30], latch circuit L1 configured to latch an output signal of the comparator COM1, and multiplexers MUX11, MUX12, and MUX13 each of which is configured to select one of the 31-midpoint voltages V[0], V[1], . . . V[30] to be input to each of comparators COM21, COM22, and COM23 in the second logic circuit on the basis of one bit latched into the latch circuit L1.

The second logic circuit is provided with comparators COM21, COM22, and COM23 each of which is configured to compare the temperature sensing voltage $V_{TS}$ with one of the 31-midpoint voltages V[0], V[1], . . . V[30], latch circuits L21, L22, and L23 configured to latch output signals of the comparators COM21, COM22, and COM23, respectively, and multiplexers MUX21, MUX22, and MUX23 each of which is configured to select one of the 31-midpoint voltages V[0], V[1], . . . V[30] to be input to each of comparators COM31, COM32, and COM33 in the third logic circuit on the basis of one bit latched into each of the latch circuits L21, L22, and L23.

The third logic circuit is provided with comparators COM31, COM32, and COM33 each of which is configured to compare the temperature sensing voltage $V_{TS}$ with one of the 31-midpoint voltages V[0], V[1], ... V[30], and latch circuits L31, L32, and L33 configured to latch output signals of the comparators COM31, COM32, and COM33, respectively.

(1) First Step

In first step, the temperature sensing voltage $V_{TS}$ is compared with an intermediate value V[15] of the 31-midpoint voltages V[0], V[1], ... V[30] by using the comparator COM1.

When $V_{TS}$ is greater than V[15] ($V_{TS}$>V[15]), the output of the comparator COM1 becomes "1", and is latched into the latch circuit L1. When $V_{TS}$ is smaller than V[15] ($V_{TS}$<V[15]), the output of the comparator COM1 becomes "0", and is latched into the latch circuit L1. The data "1"/"0" latched into the latch circuit L1 determines the most significant bit φ1 of the 5-bit temperature data.

In FIG. 6, an example in which φ1 is "1" (φ1="1") is shown.

In first step, selection of an intermediate voltage to be input to each of the comparators COM21, COM22, and COM23 used in second step is carried out.

That is, when the result of first step is $V_{TS}$>V[15], i.e., when the data φ1 latched into the latch circuit L1 is "1", the multiplexers MUX11, MUX12, and MUX13 select V[27], V[23], and V[19], respectively. Further, when the result of first step is $V_{TS}$<V[15], i.e., when the data φ1 latched into the latch circuit L1 is "0", the multiplexers MUX11, MUX12, and MUX13 select V[11], V[7], and V[3], respectively.

(2) Second and Third Steps

In second and third steps, when the result of first step is $V_{TS}$>V[15], i.e., when the data latched into the latch circuit L1 is "1", $V_{TS}$ is compared with V[27] by using the comparator COM21, $V_{TS}$ is compared with V[23] by using the comparator COM22, and $V_{TS}$ is compared with V[19] by using the comparator COM23.

When $V_{TS}$ is greater than V[27], is greater than V[23], and is greater than V[19] ($V_{TS}$>V[27], $V_{TS}$>V[23], $V_{TS}$>V[19]), the outputs X of the comparators COM21, COM22, and COM23 become "1", "1", and "1", respectively, and are latched into the latch circuits L21, L22, and L23, respectively. When the data latched into the latch circuit L22 is "1", the data "1" latched into the latch circuit L22 determines the intermediate bit φ2 of the 5-bit temperature data, and data "1" latched into the latch circuit L21 determines the intermediate bit φ3 of the 5-bit temperature data.

When $V_{TS}$ is smaller than V[27], is greater than V[23], and is greater than V[19] ($V_{TS}$<V[27], $V_{TS}$<V[23], $V_{TS}$>V[19]), the outputs X of the comparators COM21, COM22, and COM23 become "0", "1", and "1", respectively, and are latched into the latch circuits L21, L22, and L23, respectively. When the data latched into the latch circuit L22 is "1", the data "1" latched into the latch circuit L22 determines the intermediate bit φ2 of the 5-bit temperature data, and data "0" latched into the latch circuit L21 determines the intermediate bit φ3 of the 5-bit temperature data.

When $V_{TS}$ is smaller than V[27], is smaller than V[23], and is greater than V[19] ($V_{TS}$<V[27], $V_{TS}$<V[23], $V_{TS}$>V[19]), the outputs X of the comparators COM21, COM22, and COM23 become "0", "0", and "1", respectively, and are latched into the latch circuits L21, L22, and L23, respectively. When the data latched into the latch circuit L22 is "0", the data "0" latched into the latch circuit L22 determines the intermediate bit φ2 of the 5-bit temperature data, and data "1" latched into the latch circuit L23 determines the intermediate bit φ3 of the 5-bit temperature data.

When $V_{TS}$ is smaller than V[27], is smaller than V[23], and is smaller than V[19] ($V_{TS}$<V[27], $V_{TS}$<V[23], $V_{TS}$<V[19]), the outputs X of the comparators COM21, COM22, and COM23 become "0", "0", and "0", respectively, and are latched into the latch circuits L21, L22, and L23, respectively. When the data latched into the latch circuit L22 is "0", the data "0" latched into the latch circuit L22 determines the intermediate bit φ2 of the 5-bit temperature data, and data "0" latched into the latch circuit L23 determines the intermediate bit φ3 of the 5-bit temperature data.

In second and third steps, when the result of first step is $V_{TS}$<V[15], i.e., when the data latched into the latch circuit L1 is "0", $V_{TS}$ is compared with V[11] by using the comparator COM21, $V_{TS}$ is compared with V[7] by using the comparator COM22, and $V_{TS}$ is compared with V[3] by using the comparator COM23.

When $V_{TS}$ is greater than V[11], is greater than V[7], and is greater than V[3] ($V_{TS}$>V[11], $V_{TS}$>V[7], $V_{TS}$>V[3]), the outputs X of the comparators COM21, COM22, and COM23 become "1", "1", and "1", respectively, and are latched into the latch circuits L21, L22, and L23, respectively. When the data latched into the latch circuit L22 is "1", the data "1" latched into the latch circuit L22 determines the intermediate bit φ2 of the 5-bit temperature data, and data "1" latched into the latch circuit L21 determines the intermediate bit φ3 of the 5-bit temperature data.

When $V_{TS}$ is smaller than V[11], is greater than V[7], and is greater than V[3] ($V_{TS}$<V[11], $V_{TS}$>V[7], $V_{TS}$>V[3]), the outputs X of the comparators COM21, COM22, and COM23 become "0", "1", and "1", respectively, and are latched into the latch circuits L21, L22, and L23, respectively. When the data latched into the latch circuit L22 is "1", the data "1" latched into the latch circuit L22 determines the intermediate bit φ2 of the 5-bit temperature data, and data "0" latched into the latch circuit L21 determines the intermediate bit φ3 of the 5-bit temperature data.

When $V_{TS}$ is smaller than V[11], is smaller than V[7], and is greater than V[3] ($V_{TS}$<V[11], $V_{TS}$<V[7], $V_{TS}$>V[3]), the outputs X of the comparators COM21, COM22, and COM23 become "0", "0", and "1", respectively, and are latched into the latch circuits L21, L22, and L23, respectively. When the data latched into the latch circuit L22 is "0", the data "0" latched into the latch circuit L22 determines the intermediate bit φ2 of the 5-bit temperature data, and data "1" latched into the latch circuit L23 determines the intermediate bit φ3 of the 5-bit temperature data.

When $V_{TS}$ is smaller than V[11], is smaller than V[7], and is smaller than V[3] ($V_{TS}$<V[11], $V_{TS}$<V[7], $V_{TS}$<V[3]), the outputs X of the comparators COM21, COM22, and COM23 become "0", "0", and "0", respectively, and are latched into the latch circuits L21, L22, and L23, respectively. When the data latched into the latch circuit L22 is "0", the data "0" latched into the latch circuit L22 determines the intermediate bit φ2 of the 5-bit temperature data, and data "0" latched into the latch circuit L23 determines the intermediate bit φ3 of the 5-bit temperature data.

In FIG. 6, an example in which φ2 is "0" (φ2="0"), and φ3 is "1" (φ3="1") is shown.

In second and third steps, selection of an intermediate voltage to be input to each of the comparators COM31, COM32, and COM33 used in fourth and fifth steps is carried out. The selection of the intermediate voltage is carried out in a form in which the result φ1 of first step, and result X of second and third steps are reflected.

Figure 7:
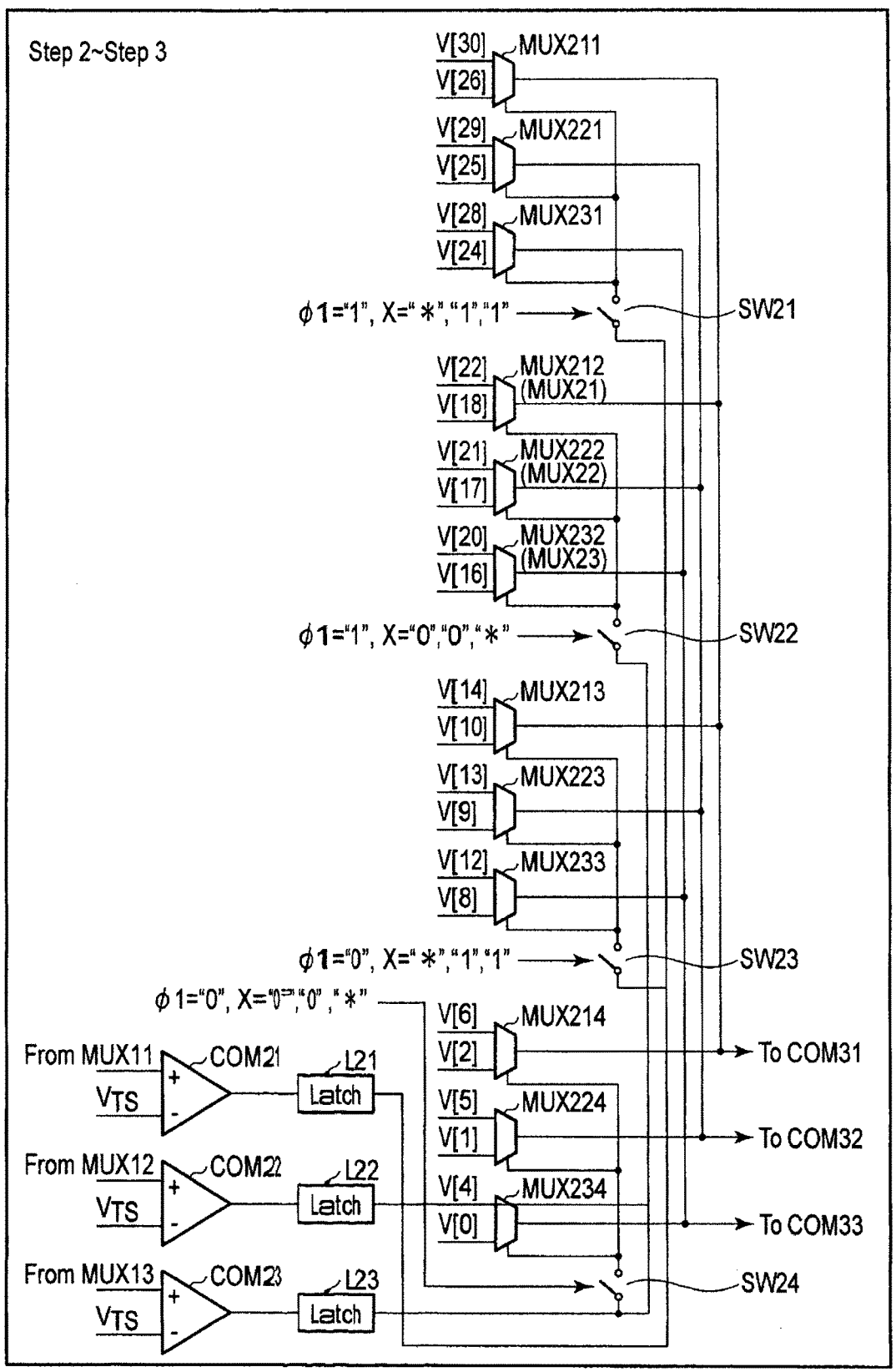
FIG. 7 is a view showing a circuit configured to carry out steps 2, and 3 of FIG. 6.

More specifically, the selection of the intermediate voltage is executed by using the circuit of FIG. 7.

That is, when the result of first step is $V_{TS}>V[15]$, and results of second and third steps are $V_{TS}>V[23]$, and $V_{TS}>V[19]$, i.e., when the data latched into the latch circuit L1 is "1", and data latched into each of the latch circuits L22 and L23 is "1", a switch SW21 is turned on.

In this case, when the result of second and third steps is $V_{TS}>V[27]$, i.e., when the data latched into the latch circuit L21 is "1", multiplexers MUX211, MUX221, and MUX231 select V[30], V[29], and V[28], respectively. Further, when the result of second and third steps is $V_{TS}<V[27]$, i.e., when the data latched into the latch circuit L21 is "0", the multiplexers MUX211, MUX221, and MUX231 select V[26], V[25], and V[24], respectively.

When the result of first step is $V_{TS}>V[15]$, and results of second and third steps are $V_{TS}<V[27]$, and $V_{TS}<V[23]$, i.e., when the data latched into the latch circuit L1 is "1", and data latched into each of the latch circuits L21, and L22 is "0", a switch SW22 is turned on.

In this case, when the result of second and third steps is $V_{TS}>V[19]$, i.e., when the data latched into the latch circuit L23 is "1", multiplexers MUX212, MUX222, and MUX232 select V[22], V[21], and V[20], respectively. Further, when the result of second and third steps is $V_{TS}<V[19]$, i.e., when the data latched into the latch circuit L23 is "0", the multiplexers MUX212, MUX222, and MUX232 select V[18], V[17], and V[16], respectively.

When the result of first step is $V_{TS}<V[15]$, and results of second and third steps are $V_{TS}>V[7]$, and $V_{TS}>V[3]$, i.e., when the data latched into the latch circuit L1 is "0", and data latched into each of the latch circuits L22 and L23 is "1", a switch SW23 is turned on.

In this case, when the result of second and third steps is $V_{TS}>V[11]$, i.e., when the data latched into the latch circuit L21 is "1", multiplexers MUX213, MUX223, and MUX233 select V[14], V[13], and V[12], respectively. Further, when the result of second and third steps is $V_T<V[11]$, i.e., when the data latched into the latch circuit L21 is "0", the multiplexers MUX213, MUX223, and MUX233 select V[10], V[9], and V[8], respectively.

When the result of first step is $V_{TS}<V[15]$, and results of second and third steps are $V_{TS}<V[11]$, and $V_{TS}<V[7]$, i.e., when the data latched into the latch circuit L1 is "0", and data latched into each of the latch circuits L21 and L22 is "0", a switch SW24 is turned on.

In this case, when the result of second and third steps is $V_{TS}>V[3]$, i.e., when the data latched into the latch circuit L23 is "1", multiplexers MUX214, MUX224, and MUX234 select V[6], V[5], and V[4], respectively. Further, the result of second and third steps is $V_{TS}<V[3]$, i.e., when the data latched into the latch circuit L23 is "0", the multiplexers MUX214, MUX224, and MUX234 select V[2], V[1], and V[0], respectively.

(3) Fourth and Fifth Steps

In fourth and fifth steps, when the result of first step is $V_{TS}>V[15]$, and results of second and third steps are $V_{TS}>V[27]$, and $V_{TS}>V[23]$, $V_{TS}$ is compared with V[30] by using the comparator COM31, $V_{TS}$ is compared with V[29] by using the comparator COM32, and $V_{TS}$ is compared with V[28] by using the comparator COM33.

When $V_{TS}$ is greater than V[30], is greater than V[29], and is greater than V[28] ($V_{TS}>V[30]$, $V_{TS}>V[29]$, $V_{TS}>V[28]$), the outputs Y of the comparators COM31, COM32, and COM33 become "1", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "1" latched into the latch circuit L31 determines the least significant bit φ5 of the 5-bit temperature data.

When $V_{TS}$ is smaller than V[30], is greater than V[29], and is greater than V[28] ($V_{TS}<V[30]$, $V_{TS}>V[29]$, $V_{TS}>V[28]$), the outputs of the comparators COM31, COM32, and COM33 become "0", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "0" latched into the latch circuit L31 determines the least significant bit φ5 of the 5-bit temperature data.

When $V_{TS}$ is smaller than V[30], is smaller than V[29], and is greater than V[28] ($V_{TS}<V[30]$, $V_{TS}<V[29]$, $V_{TS}>V[28]$), the outputs Y of the comparators COM31, COM32, and COM33 become "0", "0", and "1", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "1" latched into the latch circuit L33 determines the least significant bit φ5 of the 5-bit temperature data.

When $V_{TS}$ is smaller than V[30], is smaller than V[29], and is smaller than V[28] ($V_{TS}<V[30]$, $V_{TS}<V[29]$, $V_{TS}<V[28]$), the outputs Y of the comparators COM31, COM32, and COM33 become "0", "0", and "0", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "0" latched into the latch circuit L33 determines the least significant bit φ5 of the 5-bit temperature data.

In fourth and fifth steps, when the result of first step is $V_{TS}>V[15]$, and results of second and third steps are $V_{TS}<V[27]$, and $V_{TS}>V[23]$, $V_{TS}$ is compared with V[26] by using the comparator COM31, and $V_{TS}$ is compared with V[25] by using the comparator COM32, and $V_{TS}$ is compared with V[24] by using the comparator COM33.

When $V_{TS}$ is greater than V[26], is greater than V[25], and is greater than V[24] ($V_{TS}>V[26]$, $V_{TS}>V[25]$, $V_{TS}>V[24]$), the outputs Y of the comparators COM31, COM32, and COM33 become "1", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "1" latched into the latch circuit L31 determines the least significant bit φ5 of the 5-bit temperature data.

When $V_{TS}$ is smaller than V[26], is greater than V[25], and is greater than V[24] ($V_{TS}<V[26]$, $V_{TS}>V[25]$, $V_{TS}>V[24]$), the outputs Y of the comparators COM31, COM32, and COM33 become "0", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "0" latched into the latch circuit L31 determines the least significant bit φ5 of the 5-bit temperature data.

When $V_{TS}$ is smaller than V[26], is smaller than V[25], and is greater than V[24] ($V_{TS}<V[26]$, $V_{TS}<V[25]$, $V_{TS}>V[24]$), the outputs Y of the comparators COM31, COM32, and COM33 become "0", "0", and "1", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "1" latched into the latch circuit L33 determines the least significant bit φ5 of the 5-bit temperature data.

When $V_{TS}$ is smaller than V[26], is smaller than V[25], and is smaller than V[24] ($V_{TS}$<V[26], $V_{TS}$<V[25], $V_{TS}$<V[24]), the outputs Y of the comparators COM31, COM32, and COM33 become "0", "0", and "0", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "0" latched into the latch circuit L33 determines the least significant bit φ5 of the 5-bit temperature data.

In fourth and fifth steps, when the result of first step is $V_{TS}$>V[15], and results of second and third steps are $V_{TS}$<V[23], and $V_{TS}$>V[19], $V_{TS}$ is compared with V[22] by using the comparator COM31, $V_{TS}$ is compared with V[21] by using the comparator COM32, and $V_{TS}$ is compared with V[20] by using the comparator COM33.

When $V_{TS}$ is greater than V[22], is greater than V[21], and is greater than V[20] ($V_{TS}$>V[22], $V_{TS}$>V[21], $V_{TS}$>V[20]), the outputs Y of the comparators COM31, COM32, and COM33 become "1", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "1" latched into the latch circuit L31 determines the least significant bit φ5 of the 5-bit temperature data.

When $V_{TS}$ is smaller than V[22], is greater than V[21], and is greater than V[20] ($V_{TS}$<V[22], $V_{TS}$>V[21], $V_{TS}$>V[20]), the outputs Y of the comparators COM31, COM32, and COM33 become "0", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "0" latched into the latch circuit L31 determines the least significant bit φ5 of the 5-bit temperature data.

When $V_{TS}$ is smaller than V[22], is smaller than V[20], and is greater than V[21] ($V_{TS}$<V[22], $V_{TS}$<V[20], $V_{TS}$>V[21]), the outputs Y of the comparators COM31, COM32, and COM33 become "0", "0", and "1", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "1" latched into the latch circuit L33 determines the least significant bit φ5 of the 5-bit temperature data.

When $V_{TS}$ is smaller than V[22], is smaller than V[20], and is smaller than V[21] ($V_{TS}$<V[22], $V_{TS}$<V[20], $V_{TS}$<V[21]), the outputs Y of the comparators COM31, COM32, and COM33 become "0", "0", and "0", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "0" latched into the latch circuit L33 determines the least significant bit φ5 of the 5-bit temperature data.

In fourth and fifth steps, when the result of first step is $V_{TS}$>V[15], and results of second and third steps are $V_{TS}$<V[23], and $V_{TS}$<V[19], $V_{TS}$ is compared with V[18] by using the comparator COM31, $V_{TS}$ is compared with V[17] by using the comparator COM32, and $V_{TS}$ is compared with V[16] by using the comparator COM33.

When $V_{TS}$ is greater than V[18], is greater than V[17], and is greater than V[16] ($V_{TS}$>V[18], $V_{TS}$>V[17], $V_{TS}$>V[16]), the outputs Y of the comparators COM31, COM32, and COM33 become "1", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "1" latched into the latch circuit L31 determines the least significant bit φ5 of the 5-bit temperature data.

When $V_{TS}$ is smaller than V[18], is greater than V[17], and is greater than V[16] ($V_{TS}$<V[18], $V_{TS}$>V[17], $V_{TS}$>V[16]), the outputs Y of the comparators COM31, COM32, and COM33 become "0", "1", and "1", respectively, and are latched into the latch circuits L31, L32, and L33, respectively. When the data latched into the latch circuit L32 is "1", the data "1" latched into the latch circuit L32 determines the intermediate bit φ4 of the 5-bit temperature data, and data "0" latched into the latch circuit L31 determines the least significant bit φ5 of the 5-bit temperature data.

When $V_{TS}$ is smaller than V[18], is smaller than V[17], and is greater than V[16] ($V_{TS}$<V[18], $V_{TS}$<V[17], $V_{TS}$>V[16]), the outputs Y of the comparators COM31, COM32, and COM33 become "0", "0", and "1", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "1" latched into the latch circuit L33 determines the least significant bit φ5 of the 5-bit temperature data.

When $V_{TS}$ is smaller than V[18], is smaller than V[17], and is smaller than V[16] ($V_{TS}$<V[18], $V_{TS}$<V[17], $V_{TS}$<V[16]), the outputs Y of the comparators COM31, COM32, and COM33 become "0", "0", and "0", respectively, and are latched into the latch circuits L31, L32, and L33, respectively. When the data latched into the latch circuit L32 is "0", the data "0" latched into the latch circuit L32 determines the intermediate bit φ4 of the 5-bit temperature data, and data "0" latched into the latch circuit L33 determines the least significant bit φ5 of the 5-bit temperature data.

It should be noted that also in the case where the result of first step is $V_{TS}$<V[15], it is possible to obtain φ4 and φ5 by using the same flow as the aforementioned case where $V_{TS}$ is greater than V[15] ($V_{TS}$>V[15]).

In FIG. 6, an example in which φ4 is "0", and φ5 is "1" (φ4="0", φ5="1") is shown.

As described above, according to the second embodiment, it is possible to create 5-bit temperature data φ1="1", φ2="0", φ3="1", φ4="1", and φ5="1" indicating, for example, the real temperature Tc of an LSI chip by first to fifth steps.

Further, heretofore, although $2^5$ (=32) comparators have been required to create 5-bit temperature data, presence of seven comparators is sufficient in the second embodiment. Accordingly, it is possible to reduce the size of a temperature sensor by virtue of significant reduction in the number of comparators.

(Third Embodiment)

Figure 8:
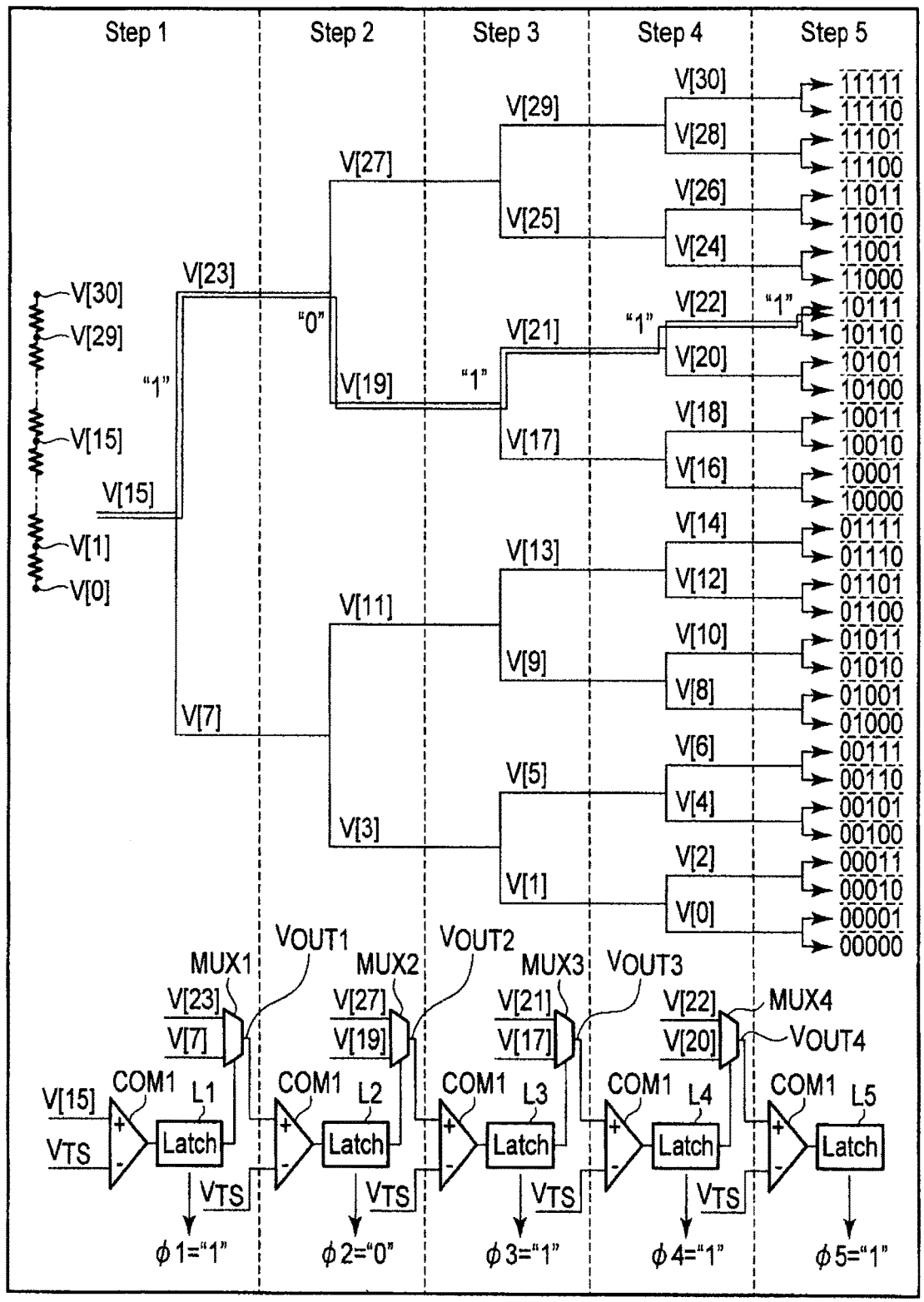
FIG. 8 is a view showing a third embodiment.

FIG. 8 shows a third embodiment.

The third embodiment is a modification of the first embodiment. The third embodiment differs from the first embodiment in that first to fifth steps (first to fifth operations) are executed by repetitively using (reusing) one comparator. That is, in the first embodiment, first to fifth steps are executed by using five comparators, conversely, in the third embodiment, first to fifth steps are executed by using one comparator.

Figure 9:
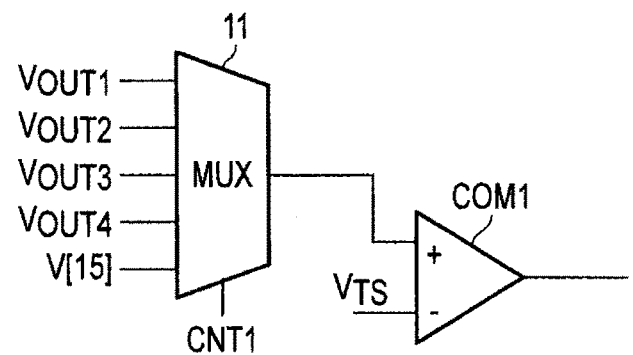
FIG. 9 is a view showing a multiplexer configured to carry out selection of a signal to be input to a non-inverting input terminal of COM 1 of FIG. 8.

For example, as shown in FIG. 8, the comparator to be used in all of first to fifth steps is COM1. In this case, as shown in FIG. 9, for example, a multiplexer 11 configured to select an intermediate value serving as a reference voltage to be input to the comparator COM1 is additionally provided.

The multiplexer 11 is used in common in first to fifth steps. In first step, the multiplexer 11 selects V[15] on the basis of a control signal CNT1.

Further, in second step, the multiplexer 11 selects an output signal $V_{OUT1}$ of a multiplexer MUX1, in third step, the multiplexer 11 selects an output signal $V_{OUT2}$ of a multiplexer MUX2, in fourth step, the multiplexer 11 selects an output signal $V_{OUT3}$ of a multiplexer MUX3, and in fifth step, the multiplexer 11 selects an output signal $V_{OUT4}$ of a multiplexer MUX4.

Other configurations are identical to the first embodiment, and hence constituent elements identical to the first embodiment are denoted by identical reference symbols, and their detailed descriptions are omitted.

As described above, according to the third embodiment, an advantage identical to the first embodiment can be obtained. Further, although in the first embodiment, five comparators are required to create the 5-bit temperature data, presence of one comparator is sufficient in the third embodiment. Accordingly, it is possible to further reduce the size of the temperature sensor by virtue of significant reduction in the number of comparators.

Further, the number of comparators is one, and hence the problem of variations in performance occurring when the number of comparators is plural does not occur. That is, all the voltage comparisons are carried out by using one comparator, and hence offsets occurring in all the voltage comparisons are identical. This means that the offset can be eliminated in each voltage comparison by compensating for the offset by trimming or the like.

Accordingly, it is possible to contribute to an improvement in the performance of the temperature sensor, and shortening or the like of the time to detection of the real time Tc. It should be noted that the compensation for the offset can be carried out by the method shown in the fifth embodiment to be described later.

(Fourth Embodiment)

Figure 10:
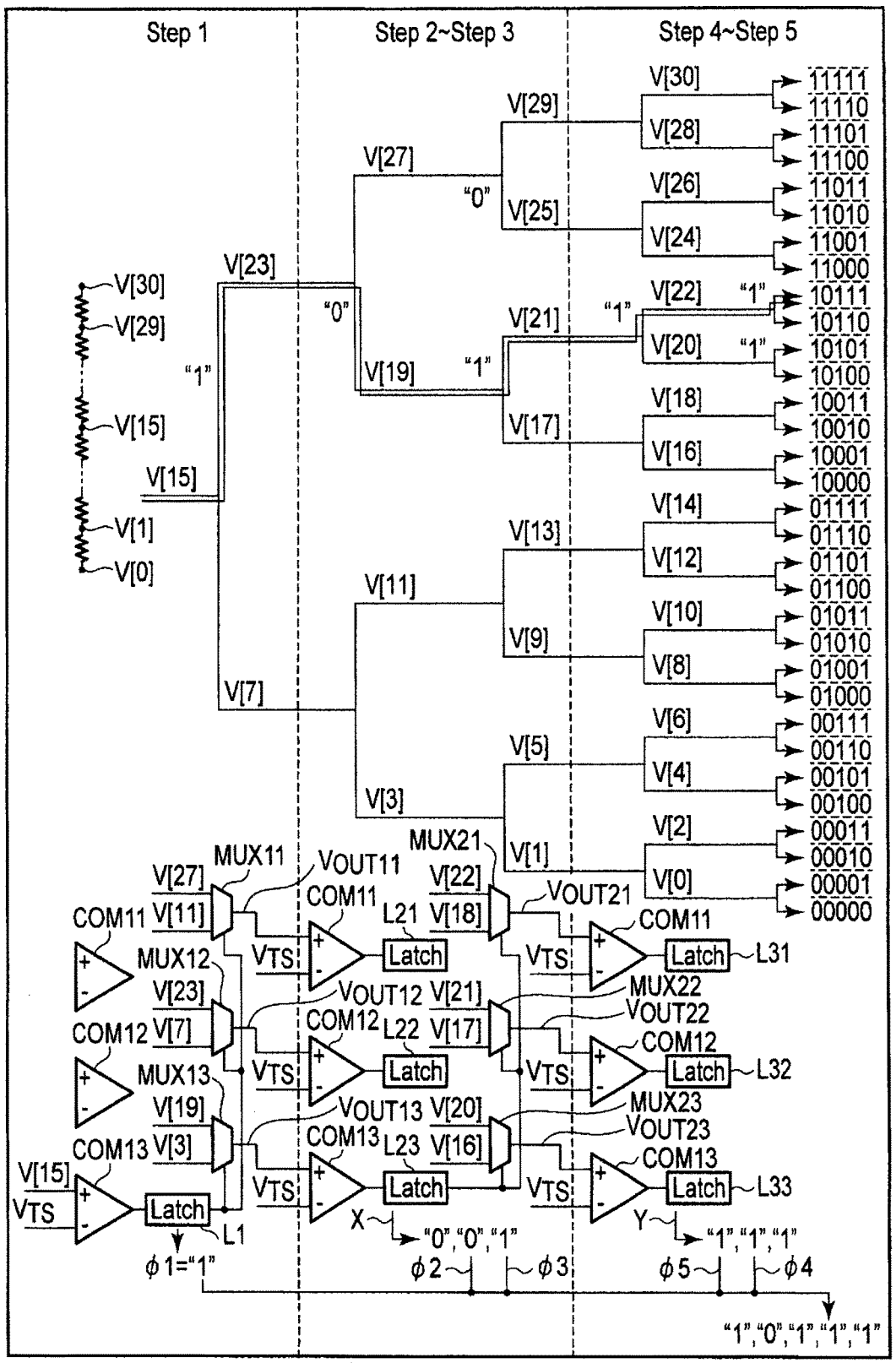
FIG. 10 is a view showing a fourth embodiment.

FIG. 10 shows a fourth embodiment.

The fourth embodiment is a modification of the second embodiment. The fourth embodiment differs from the second embodiment in that first step, second and third steps, and fourth and fifth steps are respectively executed by repetitively using (reusing) three comparators.

For example, as shown in FIG. 10, in first step, a comparator COM13 is used from among three comparators COM11, COM12, and COM13. In second and third steps, the three comparators COM11, COM12, and COM13 are used, and in also fourth and fifth steps, the three comparators COM11, COM12, and COM13 are used.

Figure 11:
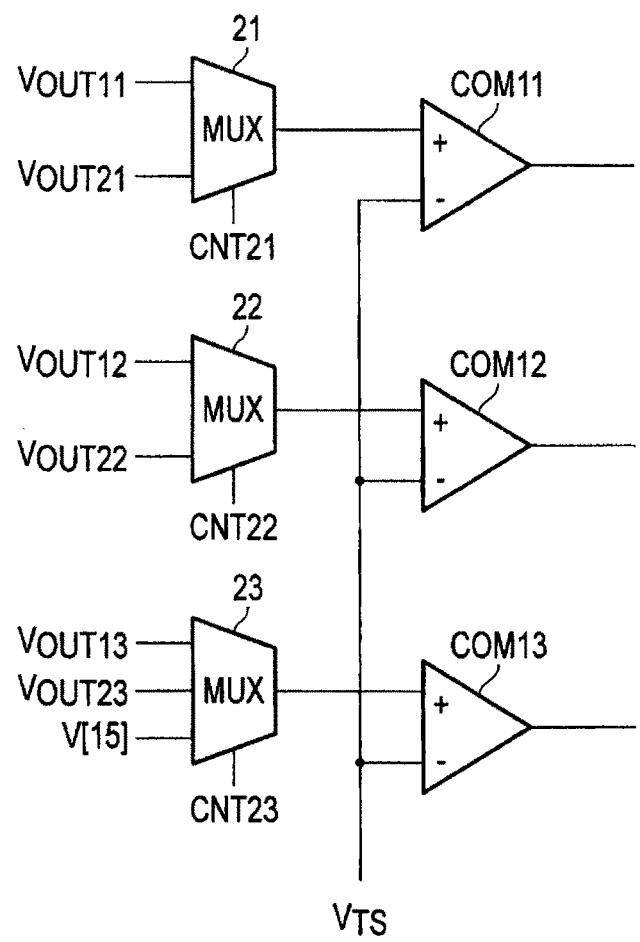
FIG. 11 is a view showing multiplexers configured to carry out selection of signals to be input to non-inverting input terminals of COM 11, COM 12, and COM 13 of FIG. 8.

In this case, as shown in FIG. 11, multiplexers 21, 22, and 23 each of which is configured to select an intermediate value serving as a reference value to be input to each of the three comparators COM11, COM12, and COM13 are additionally provided.

The multiplexers 21, 22, and 23 are used in common in first to fifth steps.

In first step, the multiplexers 21 and 22 are brought into an inactive state, and the multiplexer 23 selects V[15] on the basis of a control signal CNT23.

Further, in second and third steps, the multiplexer 21 selects an output signal $V_{OUT11}$ of a multiplexer MUX11, multiplexer 22 selects an output signal $V_{OUT12}$ of a multiplexer MUX12, and multiplexer 23 selects an output signal $V_{OUT13}$ of a multiplexer MUX13.

Furthermore, in fourth and fifth steps, the multiplexer 21 selects an output signal $V_{OUT21}$ of a multiplexer MUX21, multiplexer 22 selects an output signal $V_{OUT22}$ of a multiplexer MUX22, and multiplexer 23 selects an output signal $V_{OUT23}$ of a multiplexer MUX23.

Other configurations are identical to the second embodiment, and hence constituent elements identical to the second embodiment are denoted by identical reference symbols, and their detailed descriptions are omitted.

As described above, according to the fourth embodiment, an advantage identical to the second embodiment can be obtained. Further, although in the second embodiment, seven comparators are required to create the 5-bit temperature data, presence of three comparator is sufficient in the fourth embodiment. Accordingly, it is possible to further reduce the size of the temperature sensor by virtue of significant reduction in the number of comparators.

(Fifth Embodiment)

Figure 12:
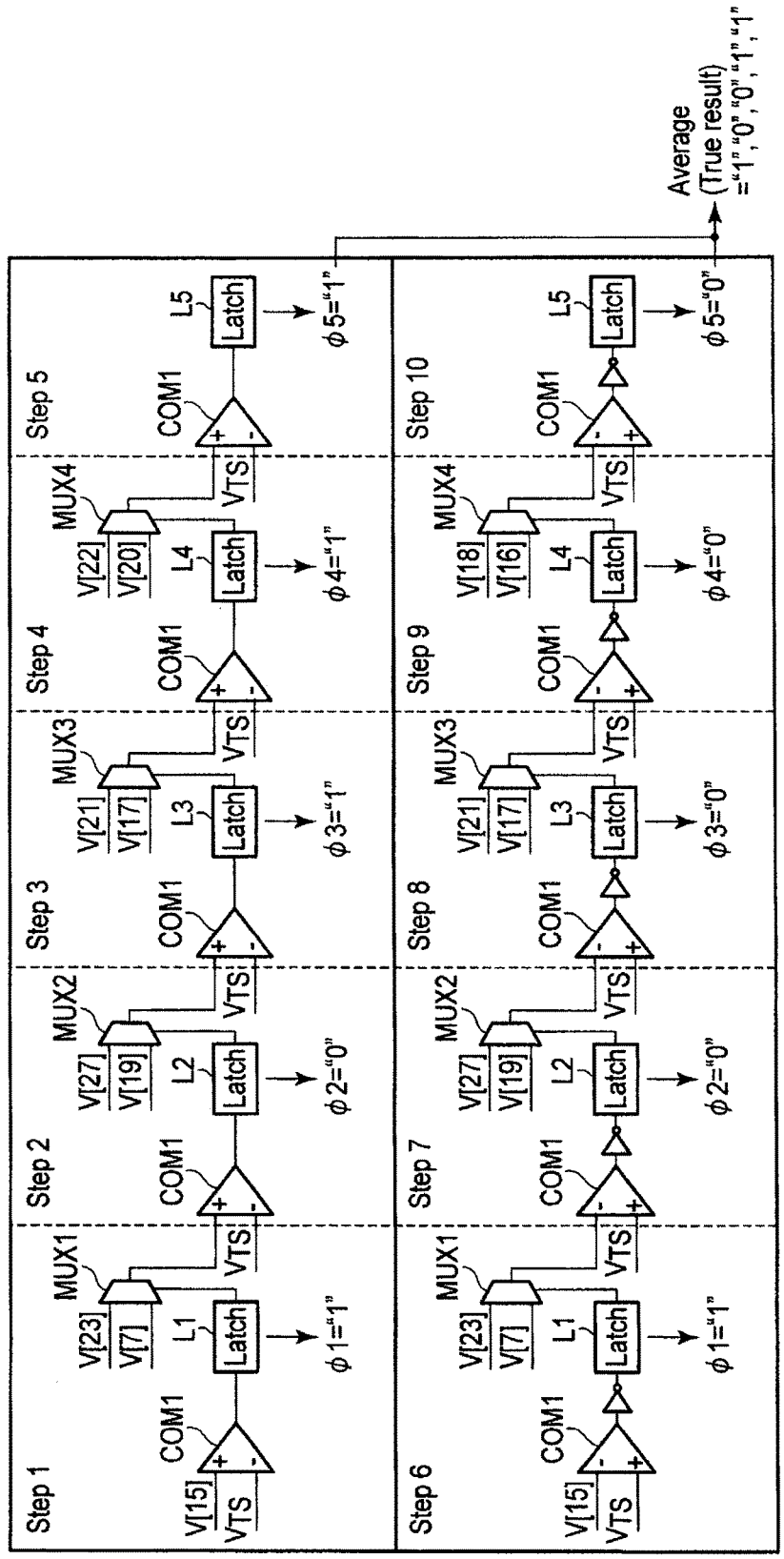
FIG. 12, and FIG. 13 are views showing a fifth embodiment.

FIG. 12 shows a fifth embodiment.

The fifth embodiment proposes a flow of evaluation in which the real temperature Tc is detected by obtaining an average of a detection value at the time at which a temperature sensing voltage $V_{TS}$ is input to the non-inverting input terminal of a comparator, and detection value at the time at which the temperature sensing voltage $V_{TS}$ is input to the inverting input terminal of the comparator.

Thereby, it is possible to compensate for an offset of the comparator.

For example, a case where this embodiment is applied to the third embodiment will be described below.

First, in first to fifth steps, the 5-bit temperature data $\phi1$="1", $\phi2$="0", $\phi3$="1", $\phi4$="1", and $\phi5$="1" is obtained by an operation identical to first to fifth steps of the third embodiment. Here, it is assumed that the temperature sensing voltage $V_{TS}$ is input to the inverting input terminal (−) of the comparator COM1.

The 5-bit temperature data $\phi1$="1", $\phi2$="0", $\phi3$="1", $\phi4$="1", and $\phi5$="1" includes an error (for example, positive error) attributable to an offset of the comparator COM1.

Next, in sixth to tenth steps, the 5-bit temperature data $\phi1$="1", $\phi2$="0", $\phi3$="0", $\phi4$="0", and $\phi5$="0" is obtained by an operation identical to first to fifth steps of the third embodiment. Here, it is assumed that the temperature sensing voltage $V_{TS}$ is input to the non-inverting input terminal (+) of the comparator COM1.

The 5-bit temperature data $\phi1$="1", $\phi2$="0", $\phi3$="0", $\phi4$="0", and $\phi5$="0" includes an error (for example, negative error) attributable to an offset of the comparator COM1.

Then, an average of the 5-bit temperature data created by first to fifth steps, and 5-bit temperature data created by sixth to tenth steps is calculated. This average becomes real temperature data.

In this embodiment, the average is each of the items $\phi1$="1", $\phi2$="0", $\phi3$="0", $\phi4$="1", and $\phi5$="1".

(Sixth Embodiment)

Figure 13:
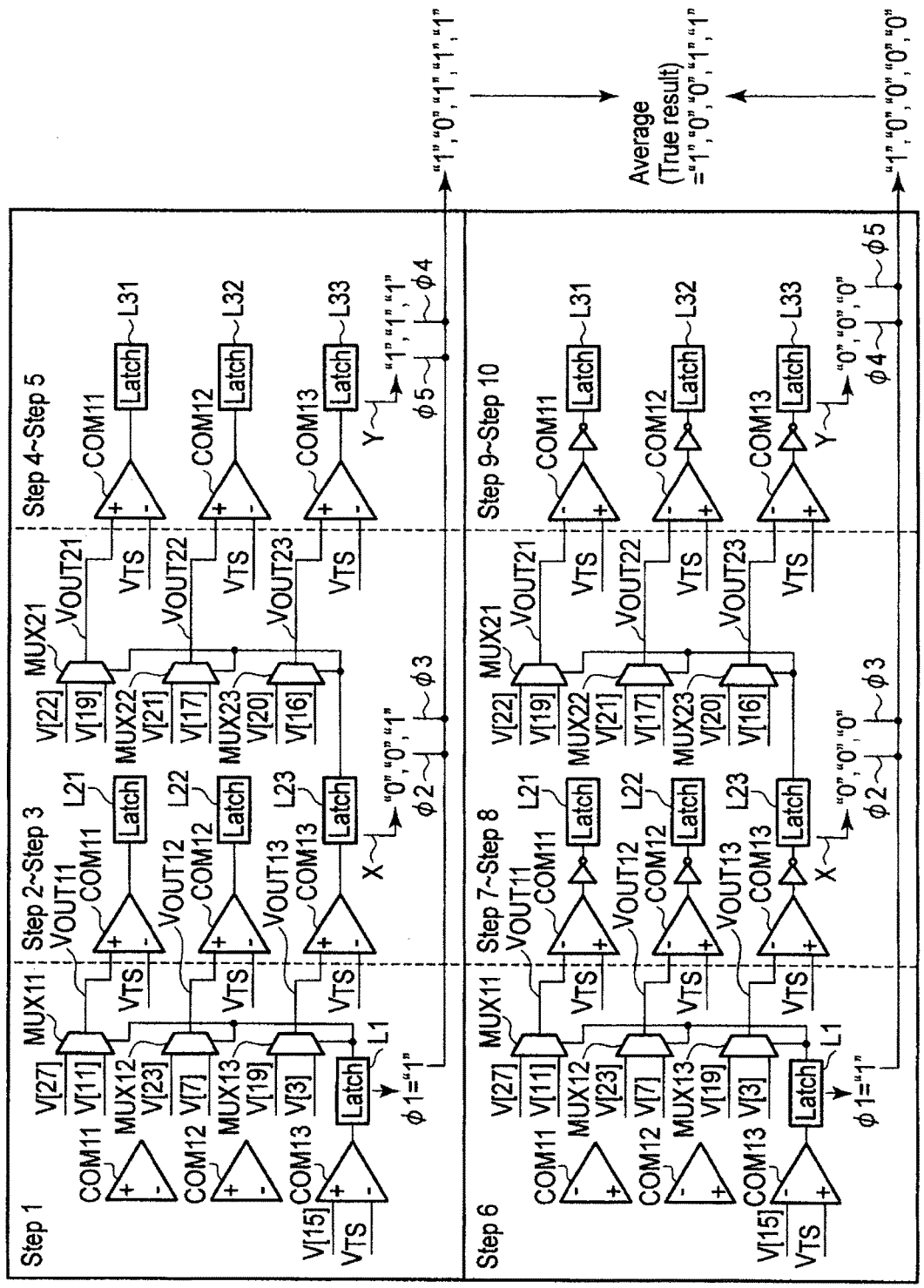

FIG. 13 shows a sixth embodiment.

Also the sixth embodiment proposes a flow of evaluation in which the real temperature Tc is detected by obtaining an average of a detection value at the time at which a temperature sensing voltage $V_{TS}$ is input to the non-inverting input terminal of a comparator, and detection value at the time at which the temperature sensing voltage $V_{TS}$ is input to the inverting input terminal of the comparator.

Thereby, it is possible to compensate for an offset of the comparator.

For example, a case where this embodiment is applied to the fourth embodiment will be described below.

First, in first to fifth steps, the 5-bit temperature data φ1="1", φ2="0", φ3="1", φ4="1", and φ5="1" is obtained by an operation identical to first to fifth steps of the fourth embodiment. Here, it is assumed that the temperature sensing voltage $V_{TS}$ is input to the inverting input terminal (−) of the comparator COM1.

The 5-bit temperature data φ1="1", φ2="0", φ3="1", φ4="1", and φ5="1" includes an error (for example, positive error) attributable to an offset of the comparator COM1.

Next, in sixth to tenth steps, the 5-bit temperature data φ1="1", φ2="0", φ3="0", φ4="0", and φ5="0" is obtained by an operation identical to first to fifth steps of the fourth embodiment. Here, it is assumed that the temperature sensing voltage $V_{TS}$ is input to the non-inverting input terminal (+) of the comparator COM1.

The 5-bit temperature data φ1="1", φ2="0", φ3="0", φ4="0", and φ5="0" includes an error (for example, negative error) attributable to an offset of the comparator COM1.

Then, an average of the 5-bit temperature data created by first to fifth steps, and 5-bit temperature data created by sixth to tenth steps is calculated. This average becomes real temperature data.

In this embodiment, the average is each of the items φ1="1", φ2="0", φ3="0", φ4="1", and φ5="1".

(Application)

It is effective to incorporate the temperature sensor associated with each of the above-mentioned embodiments in an LSI chip such as a memory chip, logic chip, microcomputer chip, and the like requiring detection of a real temperature at the operation time. In this case, the number and positions of the temperature sensors to be incorporated in the LSI chip can appropriately be changed according to the properties of the LSI chip.

(Conclusion)

As described above, according to the above-mentioned embodiments, the following conclusion is stated.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A temperature sensor comprising:
a voltage generating part generating ($2^N$−1)-midpoint voltages (N is a natural number equal to or larger than 2) based on a reference voltage which does not depend on a temperature;
a sense part generating a temperature sensing voltage which depends on the temperature; and
an arithmetic part comprising comparator, multiplexer and latch circuit configured to generate N-bit temperature data by carrying out first to N-th operations each comparing the temperature sensing voltage with one of the ($2^N$−1)-midpoint voltages.

2. The sensor of claim 1,
wherein the first operation decides a most significant bit of the N-bit temperature data, and the second operation decides a least significant bit of the N-bit temperature data.

3. The sensor of claim 1,
wherein the first to N-th operations are carried out in series.

4. The sensor of claim 3,
wherein the arithmetic part comprises first to N-th logic circuits, and
each of the first to N-th logic circuits comprises a comparator which compares the temperature sensing voltage with one of the ($2^N$−1)-midpoint voltages, and a latch circuit which latches an output signal of the comparator.

5. The sensor of claim 4,
wherein the latch circuit latches one bit of the N-bit temperature data.

6. The sensor of claim 4,
wherein an i-th logic circuit (i is one of 1 to N−1) comprises the multiplexer which selects one of the ($2^N$−1)-midpoint voltages based on one bit latched in the latch circuit in the i-th logic circuit, and one of the ($2^N$−1)-midpoint voltages selected by the multiplexer is inputted in the comparator in the (i+1)-th logic circuit.

7. The sensor of claim 4,
wherein the arithmetic part is configured to:
generate N-bit temperature data by carrying out (N+1)-th to 2N-th operations each comparing the temperature sensing voltage with one of the ($2^N$−1)-midpoint voltages, and
generate a real temperature by calculating an average of N-bit temperature data generated by the first to N-th operations and N-bit temperature data generated by the (N+1)-th to 2N-th operations.

8. The sensor of claim 7
wherein the comparator comprises a non-inverting input terminal and an inverting input terminal, and
one of the ($2^N$−1)-midpoint voltages is inputted in the inverting input terminal of the comparator in the first to N-th operations, and is inputted in the non-inverting input terminal of the comparator in the (N+1)-th to 2N-th operations.

9. The sensor of claim 3,
wherein the comparator compares the temperature sensing voltage with one of the ($2^N$−1)-midpoint voltages, and the latch circuit latches an output signal of the comparator.

10. The sensor of claim 9,
wherein the first to N-th operations are carried out by reusing the comparator repeatedly.

11. The sensor of claim 9,
wherein the latch circuit latches one bit of the N-bit temperature data.

12. The sensor of claim 9,
wherein the multiplexer selects one of the ($2^N$−1)-midpoint voltages based on one bit latched in the latch circuit in the i-th operation (i is one of 1 to N−1), and one of the ($2^N$−1)-midpoint voltages selected by the multiplexer is inputted in the comparator in the (i+1)-th operation.

13. The sensor of claim 9,
wherein the arithmetic part is configured to:
generate N-bit temperature data by carrying out (N+1)-th to 2N-th operations each comparing the temperature sensing voltage with one of the ($2^N-1$)-midpoint voltages, and
generate a real temperature by calculating an average of N-bit temperature data generated by the first to N-th operations and N-bit temperature data generated by the (N+1)-th to 2N-th operations.

14. The sensor of claim 13,
wherein the comparator comprises a non-inverting input terminal and an inverting input terminal, and
one of the ($2^N-1$)-midpoint voltages is inputted in the inverting input terminal of the comparator in the first to N-th operations, and is inputted in the non-inverting input terminal of the comparator in the (N+1)-th to 2N-th operations.

15. The sensor of claim 1,
wherein at least two operations of the first to N-th operations are executed in parallel.

16. The sensor of claim 15,
wherein when a number of the at least two operations is two, the arithmetic part comprises three comparators which compare the temperature sensing voltage with one of the ($2^N-1$)-midpoint voltages respectively, and three latch circuits which latch output signals of the three comparator respectively.

17. The sensor of claim 16,
wherein two of the three latch circuits latch two bits of the N-bit temperature data.

18. The sensor of claim 16,
wherein the first to N-th operations are carried out by reusing the three comparators repeatedly.

19. The sensor of claim 16,
wherein the arithmetic part is configured to:
generate N-bit temperature data by carrying out (N+1)-th to 2N-th operations each comparing the temperature sensing voltage with one of the ($2^N-1$)-midpoint voltages, and
generate a real temperature by calculating an average of N-bit temperature data generated by the first to N-th operations and N-bit temperature data generated by the (N+1)-th to 2N-th operations.

20. The sensor of claim 19,
wherein the comparator comprises a non-inverting input terminal and an inverting input terminal, and
one of the ($2^N-1$)-midpoint voltages is inputted in the inverting input terminal of the comparator in the first to N-th operations, and is inputted in the non-inverting input terminal of the comparator in the (N+1)-th to 2N-th operations.

21. A LSI chip comprising the sensor of claim 1, the sensor detecting a real temperature of the LSI chip.

* * * * *